(12) United States Patent
Hafner et al.

(10) Patent No.: US 6,235,856 B1
(45) Date of Patent: May 22, 2001

(54) POLYMERIZATION OF DICYCLOPENTADIENE

(75) Inventors: Andreas Hafner, Laupen; Paul Adriaan Van Der Schaaf, Fribourg; Andreas Mühlebach, Belfaux, all of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 08/860,268

(22) PCT Filed: Dec. 11, 1995

(86) PCT No.: PCT/EP95/04877

§ 371 Date: Jun. 19, 1997

§ 102(e) Date: Jun. 19, 1997

(87) PCT Pub. No.: WO96/20235

PCT Pub. Date: Jul. 4, 1996

(30) Foreign Application Priority Data

Dec. 23, 1994 (CH) .................................................. 3920/94

(51) Int. Cl.⁷ .............................. C08F 4/80; C08F 132/08
(52) U.S. Cl. ........................ 526/171; 526/172; 526/283; 526/336; 526/340.3; 526/308; 526/309; 585/22; 585/23
(58) Field of Search .................................... 526/281, 283, 526/308, 309, 171, 172; 585/22, 23

(56) References Cited

U.S. PATENT DOCUMENTS 5,491,206 * 2/1996 Brown-Wensley et al. ......... 526/126
5,849,851 * 12/1998 Grubbs et al. ......................... 526/93

OTHER PUBLICATIONS

Wilczewski, T., Cyclopentadienyl–Ruthenium and – Osmium Complexes, Journal of Organometallic Chemistry, vol. 297, pp. 331–340, 1985.*
Keim et al., Selective Hydrogenation using Protecting Groups and Two–Phase Systems, Chem. Int. Tech., vol. 55, No. 12, pp. 960–962. (ACS Abstract) 1983.*
Porri et al., Catalysts Derived From Ruthenium and Iridium for the Ring–Opening Polymerization of Cycloolefins, Makromol. Chem.., vol. 176, No. 10, pp. 3121–3125, 1975.*
Demonceau et al., Ruthenium–Catalyzed Ring–Opening Metathesis Polymerization of Cycloolefins Initiated by Diazoesters, J. Mol. Catal., vol. 76, No. 1–3, pp. 123–132. (ACS Abstract) 1992.*
A. Demonceau, et al., Journal of Molecular Catalysis, 76(1992) 123–132.
Stumpf et al., Journal of the Chemical Society, Chemical Communications, No. 11, Jun. 1995, pp. 1127–1128.

* cited by examiner

Primary Examiner—Donald R. Wilson
Assistant Examiner—R. Rabago
(74) Attorney, Agent, or Firm—Luther A. R. Hall

(57) ABSTRACT

Composition of (a) dicyclopentadiene, by itself or in a mixture with a strained cycloolefin, and (b) a catalytic amount of at least one carbene-free, divalent-cationic ruthenium or osmium compound as a single-component catalyst, which contains at least one phosphine group and a total of 2 to 5 ligands bonded to the metal atom, and which contains acid anions for charge balancing. The compositions can be polymerized by means of heat (metathesis polymerization) and are suitable for the production of shaped articles and coatings.

42 Claims, No Drawings

POLYMERIZATION OF DICYCLOPENTADIENE

The present invention relates to a composition of dicyclopentadiene (DCPD), by itself or mixed with at least one stretched cycloolefin, and a single-component catalyst from the group consisting of ruthenium- and osmiumphosphine; a process for the thermal metathesis polymerization of dicyclopentadiene; coated materials; and linear or crosslinked copolymers of dicyclopentadiene and at least one strained cycloolefin.

Thermally induced ring-opening metathesis polymerization using catalytic amounts of metal compounds has already been known for a relatively long time and is described in many instances in the literature [cf., for example, Ivin, K. J., Olefin Metathesis 1–12, Academic Press, London (1983)]. Such polymers are prepared industrially and are commercially obtainable, for example as Vestenamer®.

Feldman et al. [Feldman, J., Schrock, R. R., in: Lippard, S. J. (editor), Progress in Inorganic Chemistry 39:1–74 (1991)] describe molybdenum- and tungsten-alkylidene complexes which by themselves are only weak but together with Lewis acids are active thermal catalysts for the polymerization of cycloolefins.

WO 93/13171 describes air- and water-stable single-component and two-component catalysts based on carbonyl group-containing molybdenum and tungsten compounds and ruthenium and osmium compounds having at least one polyene ligand for thermal metathesis polymerization, and a photoactivated metathesis polymerization of strained cycloolefins, in particular norbornene and norbornene derivatives. Other polycyclic—in particular non-fused polycyclic—cycloolefins are not mentioned. The single-component catalysts of the ruthenium compounds used, namely [Ru(cumene)Cl$_2$]$_2$ and [(C$_6$H$_6$)Ru(CH$_3$CN)$_2$Cl]$^+$ PF$_6^-$, can indeed be activated by UV irradiation; however, the storage stability of the compositions with norbornene are completely inadequate. These catalysts are capable of replacing the known two-component catalysts only inadequately.

Demonceau et al. [Demonceau, A., Noels, A. F., Saive, E., Hubert, A. J., J. Mol. Catal. 76:123–132 (1992)] describe (C$_6$H$_5$)$_3$]$_3$PRuCl$_2$, (C$_6$H$_5$)$_3$]$_3$PRuHCl and (p-cumene) RuCl$_2$P(C$_6$H$_{11}$)$_3$ as thermal catalysts for ring-opening metathesis polymerization of norbornene, a fused polycycloolefin. These catalysts have not been able to find acceptance in industrial preparations because their activity is too low. It is therefore proposed to increase the activity by addition of diazo esters. It is also mentioned that only (p-cumene) RuCl$_2$P(C$_6$H$_{11}$)$_3$ is capable of polymerizing norbornene at 60° C. within a relatively short time. Cyclooctene is also mentioned as a further monomer. Other cycloolefins for metathesis polymerization are not mentioned.

WO 93/20111 describes osmium- and ruthenium-carbene compounds with phosphine ligands, for example [(H$_5$C$_6$)$_3$P]$_2$ Cl$_2$=CH—CH=C(C$_6$H$_5$)$_2$, as purely thermal catalysts for ring-opening metathesis polymerization of strained cycloolefins, in which cyclodienes, such as dicyclopentadiene, act as catalyst inhibitors and cannot be polymerized. These catalysts are difficult to prepare and are moderately stable towards moisture, so that particular protective measures must be taken for storage and processing of compositions comprising these catalysts.

Tanielan et al. [Tanielan, C., Kieffer, R., Harfouch, A., Tetrahedron Letters 52:4589–4592 (1977)] report that the ruthenium compound RuCl$_2$[P(C$_6$H$_5$)$_3$]$_3$ is deactivated by dicyclopentadiene and no polymers are formed by thermal metathesis polymerization.

It has now been found, surprisingly, that dicyclopentadiene is accessible to thermal metathesis polymerization with a single-component catalyst if carbene-free ruthenium (II)- or osmium(II)-phosphine catalysts are used. It has furthermore been found that even linear polycyclopentadiene can be prepared if the polymerization is carried out in suitable solvents, and crosslinked polymers are obtained if the polymerization is carried out in bulk. It has also been found that the polymerization takes place even in the presence of plastics additives, for example fillers, and shaped articles, foils (films) or coatings with excellent physical and mechanical properties are obtained. It has also been observed that the compositions of DCPD and carbene-free ruthenium(II)- or osmium(II)-phosphine catalysts are stable to air and moisture, and therefore both have a high storage stability, if appropriate with exclusion of light, and also necessitate no particular protective measures for the polymerization, which offers considerable advantages during processing. It has also additionally been found that, using these catalysts, DCPD can be copolymerized together with strained cycloolefins as comonomers. As a result, properties can be modified in a controlled manner and adapted to suit the desired intended use.

The invention relates to a composition of (a) dicyclopentadiene by itself or as a mixture with a strained cycloolefin and (b) a catalytic amount of at least one carbene-free, divalent-cationic ruthenium or osmium compound, as a single-component catalyst, which contains at least one phosphine group and a total of 2 to 5 ligands bonded to the metal atom and which contains acid anions for charge balancing.

In the context of the invention, total means the sum of the phosphine groups and the ligands. The ruthenium and osmium compounds preferably contain a total of 2 or 3 ligands.

The phosphine group is preferably tertiary phosphines and phosphites, in particular phosphines having 3 to 40, preferably 3 to 30, and particularly preferably 3 to 24 C atoms.

Dicyclopentadiene of the formula

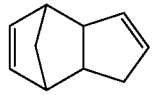

is a dimer of cyclopentadiene, which is known and commercially obtainable. However, it is known that dicyclopentadiene forms further Diels-Alder adducts with cyclopentadiene and thus forms oligomers, which can also be used. Pure dicyclopentadiene, oligomers of dicyclopentadiene or mixtures thereof can thus be used according to the invention in the composition. The oligomers can correspond to the formula

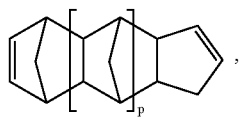

in which p is a number from 1 to 100, preferably 1 to 50, particularly preferably 1 to 20, and especially preferably 1 to 10.

A very large number of strained cycloolefins which the composition according to the invention can comprise as comonomers are known.

The cyclic olefins can be monocyclic or polycyclic fused and/or bridged ring systems, for example with two to four rings, which are unsubstituted or substituted and can contain heteroatoms, for example O, S, N or Si, in one or more rings and/or fused aromatic or heteroaromatic rings, for example o-phenylene, o-naphthylene, o-pyridinylene or o-pyrimidinylene. The individual cyclic rings can contain 3 to 16, preferably 3 to 12, and particularly preferably 3 to 8 ring members. The cyclic olefins can contain further non-aromatic double bonds, preferably 2 to 4 such additional double bonds, depending on the ring size. The ring substituents are those which are inert, i.e. which do not impair the chemical stability of ruthenium and osmium compounds. The cycloolefins are strained rings or ring systems.

If the cyclic olefins contain more than one double bond, for example 2 to 4 double bonds, crosslinked polymers can also be formed, depending on the reaction conditions, the monomer chosen and the amount of catalyst.

Fused-on alicyclic rings preferably contain 3 to 8, particularly preferably 4 to 7, and especially preferably 5 or 6 ring C atoms.

In a preferred embodiment of the process according to the invention, the cycloolefins correspond to the formula I

(I)

wherein $Q_1$ is a radical having at least one carbon atom which, together with the —CH=$CQ_2$-group, forms an alicyclic ring which has at least 3 members and which optionally contains one or more heteroatoms chosen from the group consisting of silicon, phosphorus, oxygen, nitrogen and sulfur; and which is unsubstituted or substituted by halogen, =O, —CN, —$NO_2$, $R_1R_2R_3Si$—(O)$_u$—, —COOM, —$SO_3$M, —$PO_3$M, —COO(M)$_{1/2}$, —$SO_3(M_1)_{1/2}$, —$PO_3(M_1)_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—$NR_5$—CO—; or in which an alicyclic, aromatic or heteroaromatic ring, which is unsubstituted or substituted by halogen, —CN, —$NO_2$, $R_6R_7R_8Si$—(O)$_u$—, —COOM, —$SO_3$M, —$PO_3$M, —COO($M_1$)$_{1/2}$, —$SO_3(M_1)_{1/2}$, —$PO_3(M_1)_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$—, is optionally fused onto adjacent carbon atoms of the alicyclic ring;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently of one another are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$R_5$ and $R_{10}$ independently of one another are hydrogen, $C_1$–$C_{12}$alkyl, phenyl or benzyl, where the alkyl groups in their turn are unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

in which the alicyclic ring formed with $Q_1$ optionally contains further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

wherein the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —$NO_2$, —CN or halogen, and where the heteroatoms of the abovementioned heterocycloalkyl, heteroaryl and heteroaralkyl groups are chosen from the group consisting of —O—, —S—, —$NR_9$— and —N=; and $R_9$ is hydrogen, $C_1$–$C_{12}$alkyl, phenyl or benzyl.

Fused-on alicyclic rings preferably contain 3 to 8, particularly preferably 4 to 7 and especially preferably 5 or 6 ring C atoms.

If an asymmetric center is present in the compounds of the formula I, this means that the compounds can occur in optically isomeric forms. Some compounds of the formula I can occur in tautomeric forms (for example keto-enol tautomerism). If an aliphatic C=C double bond is present, geometric isomerism (E form or Z form) can also occur. Exo-endo configurations are furthermore also possible. The formula I thus includes all the possible stereoisomers which are present in the form of enantiomers, tautomers, diestereomers, E/Z isomers or mixtures thereof.

In the definitions of the substituents, the alkyl, alkenyl and alkynyl groups can be straight-chain or branched. The same also applies to the alkyl moieties of alkoxy, alkylthio, alkoxycarbonyl and other alkyl-containing groups. These alkyl groups preferably contain 1 to 12, more preferably 1 to 8 and particularly preferably 1 to 4 C atoms. These alkenyl and alkynyl groups preferably contain 2 to 12, more preferably 2 to 8 and particularly preferably 2 to 4 C atoms.

Alkyl includes, for example, methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxy-iso-butyl, 1-hydroxy-sec-butyl, 1-hydroxy-tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Halogenoalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and halogenated, in particular fluorinated or chlorinated, alkanes, for example the isopropyl, n-propyl, n-butyl, isobutyl, sec-butyl, tert-butyl, and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-octadec-2-enyl and n-octadec-4-enyl.

Cycloalkyl is preferably $C_5$–$C_8$cycloalkyl, in particular $C_5$- or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methyinitrile), cyanoethyl (ethylnitrile), 1-cyanoisopropyl, 1-cyano-n-propyl, 2-cyano-n-butyl, 1-cyanoisobutyl, 1-cyano-sec-butyl, 1-cyano-tert-butyl and the various isomeric cyanopentyl and -hexyl radicals.

Aralkyl preferably contains 7 to 12 C atoms, and particularly preferably 7 to 10 C atoms. It can be, for example, benzyl, phenethyl, 3-phenylpropyl, α-methylbenzyl, phenbutyl or α,α-dimethylbenzyl.

Aryl preferably contains 6 to 10 C atoms. It can be, for example, phenyl, pentalin, indene, naphthalene, azuline or anthracene.

Heteroaryl preferably contains 4 or 5 C atoms and one or two heteroatoms from the group consisting of O, S and N. It can be, for example, pyrrole, furan, thiophene, oxazole, thiazole, pyridine, pyrazine, pyrimidine, pyridazine, indole, purine or quinoline.

Heterocycloalkyl preferably contains 4 or 5 C atoms and one or two heteroatoms from the group consisting of O, S and N. It can be, for example, oxirane, azirine, 1,2-oxathiolane, pyrazoline, pyrrolidine, piperidine, piperazine, morpholine, tetrahydrofuran or tetrahydrothiophene.

Alkoxy is, for example, methoxy, ethoxy, propyloxy, i-propyloxy, n-butyloxy, i-butyloxy, sec-butyloxy and t-butyloxy.

Alkali metal in the context of the present invention is to be understood as meaning lithium, sodium, potassium, rubidium and cesium, in particular lithium, sodium and potassium.

Alkaline earth metal in the context of the present invention is to be understood as meaning beryllium, magnesium, calcium, strontium and barium, in particular magnesium and calcium.

In the above definitions, halogen is to be understood as meaning fluorine, chlorine, bromine and iodine, preferably fluorine, chlorine and bromine.

Compounds of the formula I which are particularly suitable for the process according to the invention are those in which $Q_2$ is hydrogen.

Compounds of the formula I which are furthermore preferred for the polymerization are those in which the alicyclic ring which $Q_1$ forms together with the —CH=$CQ_2$— group contains 3 to 16, more preferably 3 to 12 and particularly preferably 3 to 8 ring atoms, it being possible for this ring to be a monocyclic, bicyclic, tricyclic or tetracyclic ring system.

The process according to the invention can be carried out particularly advantageously with those compounds of the formula I in which $Q_1$ is a radical having at least one carbon atom, which, together with the —CH=$CQ_2$-group, forms an alicyclic ring which has 3 to 20 members and optionally contains one or more heteroatoms chosen from the group consisting of silicon, oxygen, nitrogen and sulfur; and which is unsubstituted or substituted by halogen, =O, —CN, —$NO_2$, $R_1R_2R_3Si$—$(O)_u$—, —COOM, —$SO_3M$, —$PO_3M$, —$COO(M_1)_{1/2}$, —$SO_3(M_1)_{1/2}$, —$PO_3(M_1)_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_4$—X—; or in which two adjacent C atoms in this radical $Q_1$ are substituted by —CO—O—CO— or —CO—NR—CO—; or in which an alicyclic, aromatic or heteroaromatic ring, which is unsubstituted or substituted by halogen, —CN, —$NO_2$, $R_6R_7R_8Si$—, —COOM, —$SO_3M$, —$PO_3M$, —$COO(M)_1)_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_{13}$—$X_1$—, is optionally fused onto adjacent carbon atoms; X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—C— or —O—$SO_2$—; $R_1$, $R_2$ and $R_3$ independently of one another are $C_1$–$C_6$alkyl, $C_1$–$C_6$perfluoroalkyl, phenyl or benzyl; M is an alkali metal and $M_1$ is an alkaline earth metal; $R_4$ and $R_{13}$ independently of one another are $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl or $C_7$–$C_{12}$aralkyl; $R_5$ and $R_{10}$ independently of one another are hydrogen, $C_1$–$C_6$alkyl, phenyl or benzyl, where the alkyl groups in their turn are unsubstituted or substituted by $C_1$–$C_6$alkoxy or $C_3$–$C_6$cycloalkyl; $R_6$, $R_7$ and $R_8$ independently of one another are $C_1$–$C_6$alkyl, $C_1$–$C_6$perfluoroalkyl, phenyl or benzyl; u is 0 or 1; wherein the alicyclic ring formed with $Q_1$ optionally contains further nonaromatic double bonds; $Q_2$ is hydrogen, $C_1$–$C_{12}$alkyl, $C_1$–$C_{12}$haloalkyl, $C_1$–$C_6$alkoxy, halogen, —CN or $R_{11}$—$X_2$—; $R_{11}$ is $C_1$–$C_{12}$alkyl, $C_1$–$C_{12}$haloalkyl, $C_1$–$C_{12}$hydroxyalkyl, $C_3$–$C_6$cycloalkyl, $C_6$–$C_{12}$aryl or $C_7$–$C_{12}$aralkyl; $X_2$ is —C(O)—O— or —C(O)—$NR_{12}$—; and $R_{12}$ is hydrogen, $C_1$–$C_6$alkyl, phenyl or benzyl; wherein the cycloalkyl, heterocycloalkyl, aryl, heteroaryl, aralkyl and heteroaralkyl groups are unsubstituted or substituted by $C_1$–$C_6$alkyl, $C_1$–$C_6$alkoxy, —$NO_2$, —CN or halogen, and wherein the heteroatoms of the heterocycloalkyl, heteroaryl and heteroaralkyl groups are chosen from the group consisting of —O—, —S—, —$NR_9$— and —N=; and $R_9$ is hydrogen, $C_1$–$C_6$alkyl, phenyl or benzyl.

Preferred compounds from this group are those compounds of the formula I in which $Q_1$ is a radical having at least one carbon atom, which, together with the —CH=$CQ_2$-group, forms an alicyclic ring which has 3 to 10 members and optionally contains a heteroatom chosen from the group consisting of silicon, oxygen, nitrogen and sulfur, and which is unsubstituted or substituted by halogen, —CN, —$NO_2$, $R_1R_2R_3Si$—, —COOM, —$SO_3M$, —$PO_3M$, —$COO(M_1)_{1/2}$, —$SO_3(M_1)_{1/2}$, —$PO_3(M_1)_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$—X—; or in which an alicyclic, aromatic or heteroaromatic ring, which is unsubstituted or substituted by halogen, —CN, —$NO_2$, $R_6R_7R_8Si$—, —COOM, —$SO_3M$, —$PO_3M$, —$COO(M_1)_{1/2}$, —$SO_3(M_1)_{1/2}$, —$PO_3(M_1)_{1/2}$, $C_1$–$C_6$-Alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—$X_1$—, is optionally fused onto adjacent carbon atoms; $R_1$, $R_2$ and $R_3$ independently of one another are $C_1$–$C_4$alkyl, $C_1$–$C_4$perfluoroalkyl, phenyl or benzyl; M is an alkali metal and $M_1$ is an alkaline earth metal; $R_4$ and $R_{13}$ independently of one another are $C_1$–$C_6$alkyl, $C_1$–$C_6$haloalkyl, $C_1$–$C_6$hydroxyalkyl or $C_3$–$C_6$cycloalkyl; X and $X_1$ independently of one another are —O—, —S—, —CO—, —SO— or —$SO_2$—; $R_6$, $R_7$ and $R_8$ independently of one another are $C_1$–$C_4$alkyl, $C_1$–$C_4$perfluoroalkyl, phenyl or benzyl; and $Q_2$ is hydrogen.

The process according to the invention is particularly suitable for the polymerization of norbornene and norbornene derivatives. Particularly preferred derivatives among these norbornene derivatives are those which correspond alternatively to the formula II

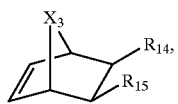
(II)

wherein $X_3$ is —$CHR_{16}$—, oxygen or sulfur;

$R_{14}$ and $R_{15}$ independently of one another are hydrogen, —CN, trifluoromethyl, $(CH_3)_3Si$—O—, $(CH_3)_3Si$— or —$COOR_{17}$; and $R_{16}$ and $R_{17}$ independently of one another are hydrogen, $C_1$–$C_{12}$alkyl, phenyl or benzyl;

or to the formula III

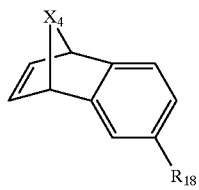
(III)

wherein $X_4$ is —$CHR_{19}$—, oxygen or sulfur;

$R_{19}$ is hydrogen, $C_1$–$C_{12}$alkyl, phenyl or benzyl; and $R_{18}$ is hydrogen, $C_1$–$C_6$alkyl or halogen;

or to the formula IV

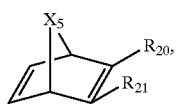
(IV)

wherein $X_5$ is —$CHR_{22}$—, oxygen or sulfur;

$R_{22}$ is hydrogen, $C_1$–$C_{12}$alkyl, phenyl or benzyl;

$R_{20}$ and $R_{21}$ independently of one another are hydrogen, CN, trifluoromethyl, $(CH_3)_3Si$—O—, $(CH_3)_3Si$— or —$COOR_{23}$; and $R_{23}$ is hydrogen, $C_1$–$C_{12}$alkyl, phenyl or benzyl;

or to the formula V

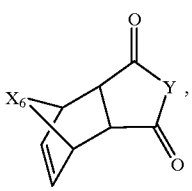
(V)

wherein $X_6$ is —$CHR_{24}$—, oxygen or sulfur;

$R_{24}$ is hydrogen, $C_1$–$C_{12}$alkyl, phenyl or benzyl;

Y is oxygen or

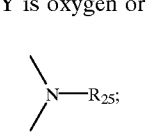

and $R_{25}$ is hydrogen, methyl, ethyl or phenyl.

The following compounds of the formula I are particularly suitable for the polymerization process according to the invention, bi- and polycyclic systems being accessible by Diels-Alder reactions:

(1)

(2)

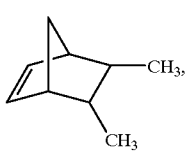
(3)

(4)

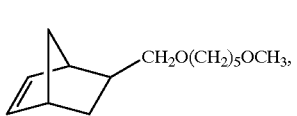
(5)

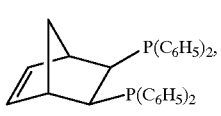
(6)

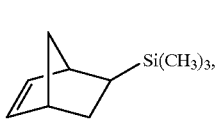
(7)

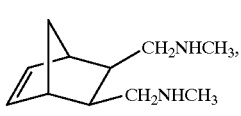
(8)

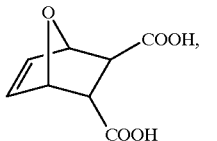
(9)

-continued
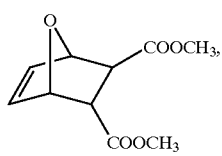 (10)
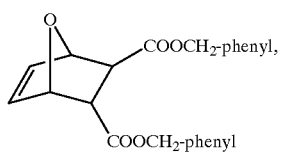 (11)
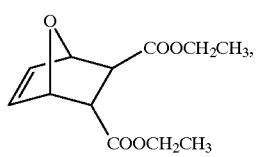 (12)
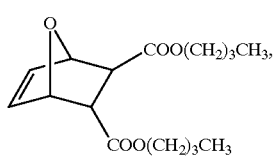 (13)
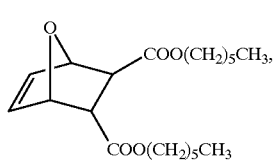 (14)
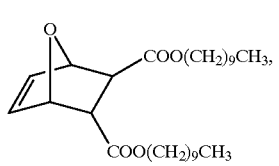 (15)
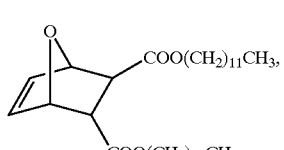 (16)
 (17)
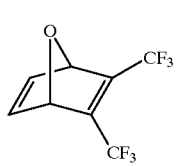 (18)
-continued
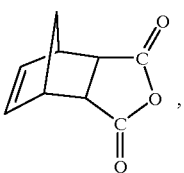 (19)
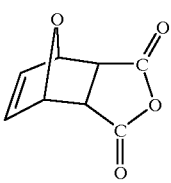 (20)
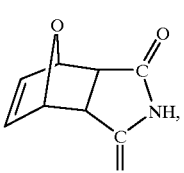 (21)
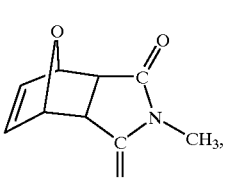 (22)
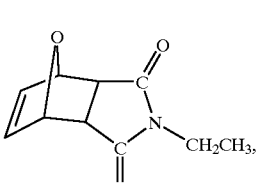 (23)
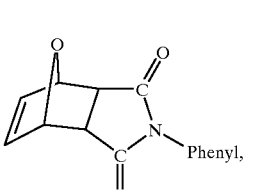 (24)
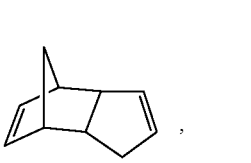 (25)
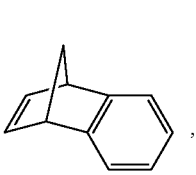 (26)

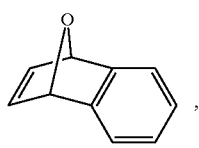 (27)
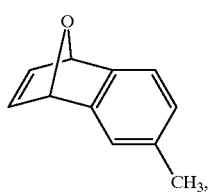 (28)
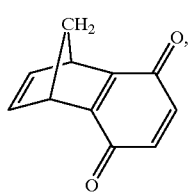 (29)
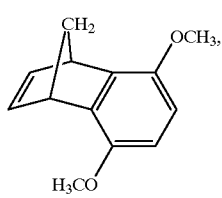 (30)
 (31)
 (32)
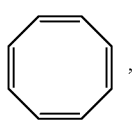 (33)
 (34)
 (35)
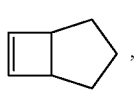 (36)
 (37)
 (38)
 (39)
 (40)
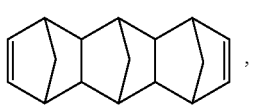 (41)
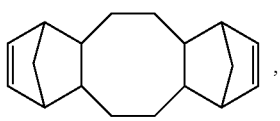 (42)
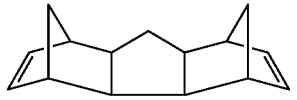 (43)
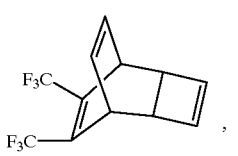 (44)
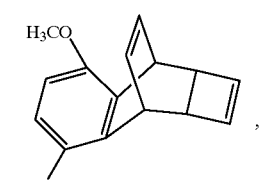 (45)
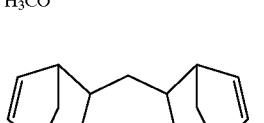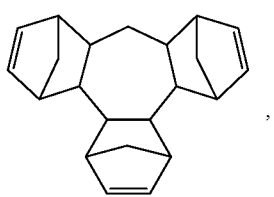 (45)

-continued

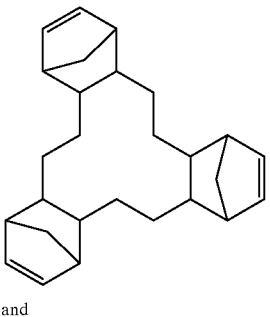

and

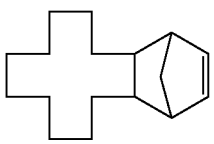

(47)

(47)

Monomers and comonomers which contain only carbon and hydrogen are particularly preferably used according to the invention.

The composition can comprise the comonomeric cycloolefins in an amount of 0.01 to 99% by weight, preferably 0.1 to 95% by weight, particularly preferably 1 to 90% by weight, and especially preferably 5 to 80% by weight, based on the monomers present in the composition. The composition especially preferably comprises norbornene as the comonomer in amounts of, for example, 20 to 60% by weight.

In the ruthenium and osmium compounds to be used according to the invention, the monophosphine can be bonded to the metal atom once, twice or three times and a diphosphine can be bonded once. Preferably 1 to 4, more preferably 1 to 3, and especially preferably 2 ligands are bonded in the ruthenium and osmium catalysts. The phosphine ligands preferably correspond to the formulae VI and VIa

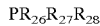  (VI),

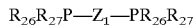  (VIa), wherein $R_{26}$, $R_{27}$ and $R_{28}$ independently of one another are H, $C_1$–$C_{20}$alkyl, $C_1$–$C_{20}$alkoxy, $C_4$–$C_{12}$cycloalkyl or cycloalkoxy which are unsubstituted or substituted by $C_1$–$C_6$alkyl, $C_1$–$C_6$haloalkyl or $C_1$–$C_6$alkoxy, or $C_6$–$C_{16}$aryl or $C_6$–$C_{16}$aryloxy which are unsubstituted or substituted by $C_1$–$C_6$alkyl, $C_1$–$C_6$haloalkyl or $C_1$–$C_6$alkoxy, or $C_7$–$C_{16}$aralkyl or $C_7$–$C_{16}$aralkyloxy which are unsubstituted or substituted by $C_1$–$C_6$alkyl, $C_1$–$C_6$haloalkyl or $C_1$–$C_6$alkoxy; the radicals $R_{26}$ and $R_{27}$ together are tetra- or pentamethylene or tetra- or pentamethylenedioxyl, which are unsubstituted or substituted by $C_1$–$C_6$alkyl, $C_1$–$C_6$haloalkyl or $C_1$–$C_6$alkoxy, or tetra- or pentamethylene or tetra- or pentamethylenedioxyl which is unsubstituted or substituted by $C_1$–$C_6$alkyl, $C_1$–$C_6$haloalkyl or $C_1$–$C_6$alkoxy and fused with 1 or 2 1,2-phenylene, or tetramethylenedioxyl which is unsubstituted or substituted by $C_1$–$C_6$alkyl, $C_1$–$C_6$haloalkyl or $C_1$–$C_6$alkoxy and fused in the 1,2- and 3,4-positions with 1,2-phenylene, and $R_{28}$ has the above-mentioned meaning; and $Z_1$ is linear or branched $C_2$–$C_{12}$alkylene which is unsubstituted or substituted by $C_1$–$C_4$alkoxy, 1,2- or 1,3-cycloalkylene which has 4 to 8 C atoms and is unsubstituted or substituted by $C_1$–$C_4$alkyl or $C_1$–$C_4$alkoxy, or 1,2- or 1,3-heterocycloalkylene which has 5 or 6 ring members and a heteroatom from the group consisting of O and N and is unsubstituted or substituted by $C_1$–$C_4$alkyl or $C_1$–$C_4$alkoxy.

The radicals $R_{26}$, $R_{27}$ and $R_{28}$ are preferably identical radicals. Sterically bulky radicals, for example branched, in particular α-branched alkyl or alkoxy, or cyclic radicals, are furthermore preferred.

Alkyl $R_{26}$, $R_{27}$ and $R_{28}$ can be linear or branched and can preferably contain 1 to 12, more preferably 1 to 8, and particularly preferably 1 to 6 C atoms. Examples of alkyl are methyl, ethyl, n- and i-propyl, n-, i- and t-butyl and the isomers of pentyl, hexyl, heptyl, octyl, nonyl, decyl, undecyl, dodecyl, tridecyl, tetradecyl, pentadecyl, hexadecyl, heptadecyl, octadecyl and eicosyl. Preferred examples are methyl, ethyl, n- and i-propyl, n-, i- and t-butyl, 1-, 2- or 3pentyl and 1-, 2-, 3- or 4-hexyl.

Alkoxy $R_{26}$, $R_{27}$ and $R_{28}$ can be linear or branched and can preferably contain 1 to 12, more preferably 1 to 8, and particularly preferably 1 to 6 C atoms. Examples of alkoxy are methoxy, ethoxy, n- and i-propyloxy, n-, i- and t-butyloxy and the isomers of pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy and eicosyloxy. Preferred examples are methoxy, ethoxy, n- and i-propyloxy, n-, i- and t-butyloxy, 1-, 2- or 3-pentyloxy and 1-, 2-, 3- or 4-hexyloxy.

If $R_{26}$, $R_{27}$ and $R_{28}$ are substituted, the substituents are preferably $C_1$–$C_4$alkyl, $C_1$–$C_4$haloalkyl or $C_1$–$C_4$alkoxy. Halogen is preferably Cl, and particularly preferably F. Examples of preferred substituents are methyl, methoxy, ethyl, ethoxy and trifluoromethyl. $R_{26}$, $R_{27}$ and $R_{28}$ are preferably mono- to trisubstituted.

Cycloalkyl $R_{26}$, $R_{27}$ and $R_{28}$ is preferably $C_5$–$C_8$cycloalkyl, and particularly preferably $C_5$- or $C_6$cycloalkyl. Some examples are cyclobutyl, cycloheptyl, cyclooctyl and, in particular, cyclopentyl and cyclohexyl. Examples of substituted cycloalkyl are methyl-, dimethyl-, trimethyl-, methoxy-, dimethoxy-, trimethoxy-, trifluoromethyl-, bistrifluoromethyl- and tristrifluoromethyl-cyclopentyl and -cyclohexyl.

Cycloalkyloxy $R_{26}$, $R_{27}$ and $R_{28}$ is preferably $C_5$–$C_8$cycloalkyloxy, and particularly preferably $C_6$- or $C_6$cycloalkyloxy. Some examples are cyclobutyloxy, cycloheptyloxy, cyclooctyloxy and, in particular, cyclopentyloxy and cyclohexyloxy. Examples of substituted cycloalkyl are methyl-, dimethyl-, trimethyl-, methoxy-, dimethoxy-, trimethoxy-, trifluoromethyl-, bistrifluoromethyl- and tristrifluoromethylcyclopentyloxy and -cyclohexyloxy.

Aryl $R_{26}$, $R_{27}$ and $R_{28}$ is preferably $C_6$–$C_{12}$aryl, and particularly preferably phenyl or naphthyl. Examples of substituted aryl are methyl-, dimethyl-, trimethyl-, methoxy-, dimethoxy-, trimethoxy-, trifluoromethyl-, bistrifluoromethyl- and tristrifluoromethylphenyl.

Aryloxy $R_{26}$, $R_{27}$ and $R_{28}$ is preferably $C_6$–$C_{12}$aryloxy and particularly preferably unsubstituted or substituted phenyloxy or naphthyloxy. Examples of substituted aryloxy are methyl-, dimethyl-, trimethyl-, methylisopropyl-, isopropyl-, diisopropyl-, triisopropyl-, tert-butyl-, methyltert-butyl-, ditertbutyl-, tritert-butyl-, methoxy-, dimethoxy-, trimethoxy-, trifluoromethyl, bistrifluoromethyl- and tristrifluoromethylphenyloxy.

Aralkyl $R_{26}$, $R_{27}$ and $R_{28}$ is preferably $C_7$–$C_{13}$aralkyl, the alkylene group in the aralkyl preferably being methylene.

The aralkyl is particularly preferably benzyl. Examples of substituted aralkyl are methyl-, dimethyl-, trimethyl-, methoxy-, dimethoxy-, trimethoxy-, trifluoromethyl-, bistrifluoromethyl- and tristrifluoromethylbenzyl.

Aralkyloxy $R_{26}$, $R_{27}$ and $R_{28}$ is preferably unsubstituted or substituted $C_7$–$C_{13}$aralkyloxy, the alkylene group in the aralkyloxy preferably being methylene. The aralkyloxy is particularly preferably unsubstituted or substituted benzyloxy. Examples of substituted aralkyloxy are methyl-, dimethyl-, trimethyl-, methoxy-, dimethoxy-, trimethoxy-, trifluoromethyl-, bistrifluoromethyl- and tristrifluoromethylbenzyloxy.

Examples of optionally substituted or fused tetra- and pentamethylene which are bonded to the P atom are

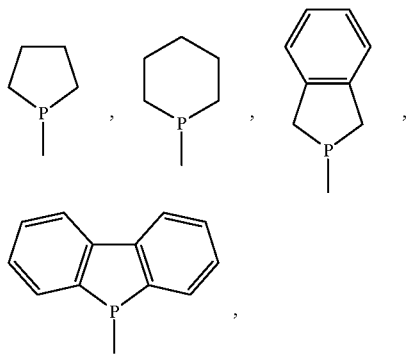

Other suitable phosphines are cycloaliphatics which have 6 to 8 ring carbon atoms and are bridged with a =PRa group, for example

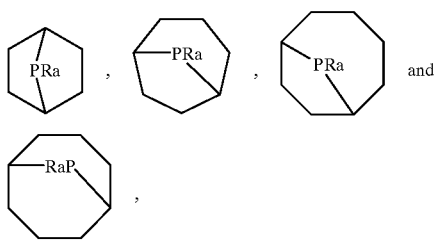

wherein Ra is $C_1$–$C_6$alkyl, cyclohexyl, benzyl, or phenyl which is unsubstituted or substituted by 1 or 2 $C_1$–$C_4$alkyl.

Linear or branched alkylene $Z_1$ is preferably 1,2-alkylene or 1,3-alkylene having preferably 2 to 6 C atoms, for example ethylene, 1,2-propylene or 1,2-butylene.

Examples of cycloalkylene $Z_1$ are 1,2- and 1,3-cyclopentylene and 1,2- or 1,3-cyclohexylene. Examples of heterocycloalkylene $Z_1$ are 1,2- and 1,3-pyrrolidine, 1,2- and 1,3-piperidine, and 1,2- and 1,3-tetrahydrofuran.

In a preferred embodiment, the phosphine ligands correspond to the formula VI wherein $R_{26}$, $R_{27}$ and $R_{28}$ independently of one another are H, $C_1$–$C_6$alkyl, cyclopentyl or cyclohexyl which are unsubstituted or substituted by $C_1$–$C_4$alkyl, or phenyl or phenyl which are unsubstituted or substituted by $C_1$–$C_4$alkyl, $C_1$–$C_4$alkyl $C_1$–$C_4$alkoxy or trifluoromethyl, or benzyl which is unsubstituted or substituted by $C_1$–$C_4$alkyl, $C_1$–$C_4$alkoxy or trifluoromethyl. Particularly preferred examples of phosphine ligands of the formula VI are $(C_6H_5)H_2P$, $(3\text{-}CH_3\text{-}6t\text{-}C_4H_9\text{—}C_6H_3)_3P$, $(3\text{-}CH_3\text{-}6\text{-}t\text{-}C_4H_9\text{—}C_6H_3)_3P$, $PH_3$, $(2,6\text{-di-}t\text{-}C_4H_9\text{—}C_6H_3)_3P$, $(2,3\text{-di-}t\text{-}C_4H_9\text{—}C_6H_3)_3P$, $(2,4\text{-di-}t\text{-}C_4H_9\text{—}C_6H_3)_3P$, $(2,4\text{-di-}CH_3\text{—}C_6H_3)_3P$, $(2,6\text{di-}CH_3\text{—}C_6H_3)_3P$, $(2\text{-}CH_3\text{-}6\text{-}t\text{-}C_4H_9\text{—}C_6H_3)_3P$, $(CH_3)_3P$, $(2\text{-}i\text{-}C_3H_7\text{—}C_6H_4)_3P$, $(3\text{-}i\text{-}C_3H_7\text{—}C_6H_4)_3P$, $(4\text{-}i\text{-}C_3H_7\text{—}C_6H_4)_3P$, $(2\text{-}n\text{-}C_4H_9\text{—}C_6H_4)_3P$, $(3\text{-}n\text{-}C_4H_9\text{—}C_6H_4)_3P$, $(4\text{-}n\text{-}C_4H_9\text{—}C_6H_4)_3P$, $(2\text{-}i\text{-}C_4H_9\text{—}C_6H_4)_3P$, $(3\text{-}i\text{-}C_4H_9\text{—}C_6H_4)_3P$, $(4\text{-}i\text{-}C_4H_9C_6H_4)_3P$, $(2\text{-}t\text{-}C_4H_9\text{—}C_6H_4)_3P$, $(3\text{-}t\text{-}C_4H_9\text{—}C_6H_4)_3P$, $(4\text{-}t\text{-}C_4H_9\text{—}C_6H_4)_3P$, $(4\text{-}C_2H_5\text{—}C_6H_4)_3P$, $(3\text{-}n\text{-}C_3H_7\text{—}C_6H_4)_3P$, $(2\text{-}n\text{-}C_3H_7\text{—}C_6H_4)_3P$, $(4\text{-}n\text{-}C_3H_7\text{—}C_6H_4)_3P$, $(C_2H_5)_2HP$, $(3\text{-}CH_3\text{—}C_6H_4)_3P$, $(4\text{-}CH_3\text{—}C_6H_4)_3P$, $(2\text{-}C_2H_5\text{—}C_6H_4)_3P$, $(3\text{-}C_2H_5\text{—}C_6H_4)_3P$, $(i\text{-}C_3H_7)H_2P$, $(n\text{-}C_4H_9)H_2P$, $(C_6H_5CH_2)_2$ HP, $(C_6H_5CH_2)H_2P$, $(2\text{-}CH_3\text{—}C_6H_4)_3P$, $(C_6H_5)_3$ P, $(C_5H_{11})H_2P$, $(C_6H_5CH_2)_3P$, $(n\text{-}C_3H_7)_2HP$, $(i\text{-}C_3H_7)_2HP$, $(n\text{-}C_4H_9)_2$ HP, $(n\text{-}C_3H_7)H_2P$, $(C_2H_5)H_2P$, $(C_5H_{11})_3P$, $(C_6H_5)_2HP$, $(C_5H_{11})_2HP$, $(n\text{-}C_3H_7)_3P$, $(i\text{-}C_3H_7)_3P$, $(n\text{-}C_4H_9)_3P$, $(CH_3)_2$ HP, $(C_2H_5)_3P$, $(C_6H_{11})_3P$, $(C_6H_{11})_2HP$, $(C_5H_9)_3P$, $(C_5H_9)_2$ HP and $(CH_3)H_2P$.

In another preferred embodiment, the phosphine ligands correspond to the formula VI wherein $R_{26}$, $R_{27}$ and $R_{28}$ independently of one another are H, $C_1$–$C_6$alkoxy, cyclopentyloxy or cyclohexyloxy which are unsubstituted or substituted by $C_1$–$C_4$alkyl, or phenyloxy or phenyl which are unsubstituted or substituted by $C_1$–$C_4$alkyl, $C_1$–$C_4$alkoxy or trifluoromethyl, or benzyloxy which is unsubstituted or substituted by $C_1$–$C_4$alkyl, $C_1$–$C_4$alkyl, $C_1$–$C_4$alkoxy or trifluoromethyl.

Examples of phosphites are $(CH_3O)_3P$, $(C_2H_5O)_3P$, $(n\text{-}C_3H_7O)_3P$, $(i\text{-}C_3H_7O)_3P$, $(n\text{-}C_4H_9O)_3P$, $(i\text{-}C_4H_9O)_3P$, $(t\text{-}C_4H_9O)_3P$, $(C_6H_5O)_3P$, $(2,4\text{-di-}CH_3\text{—}C_6H_3O)_3P$, $(2,6\text{-di-}CH_3\text{—}C_6H_3O)_3P$, $(2\text{-}C_2H_5\text{—}C_8H_4O)_3P$, $(3\text{-}C_2H_5\text{—}C_6H_4O)_3$ P, $(4\text{-}C_2H_5\text{—}C_6H_4O)_3P$, $(2\text{-}n\text{-}C_3H_7\text{—}C_6H_4O)_3P$, $(3\text{-}n\text{-}C_3H_7\text{—}C_6H_4O)_3P$, $(4\text{-}n\text{-}C_3H_7\text{—}C_6H_4O)_3P$, $(2\text{-}i\text{-}C_3H_7\text{—}C_6H_4O)_3P$, $(3\text{-}i\text{-}C_3H_7\text{—}C_6H_4O)_3P$, $(4\text{-}i\text{-}C_3H_7\text{—}C_6H_4O)_3P$, $(2\text{-}n\text{-}C_4H_9\text{—}C_6H_4O)P$, $(3\text{-}n\text{-}C_4H_9\text{—}C_8H_4O)_3P$, $(4\text{-}n\text{-}C_4H_9\text{—}C_5H_4O)_3P$, $(2\text{-}i\text{-}C_4H_9\text{—}C_6H_4O)_3P$, $(3\text{-}i\text{-}C_4H_9\text{—}C_6H_4O)_3P$, $(4\text{-}i\text{-}C_4H_9\text{—}C_6H_4O)_3P$, $(2\text{-}t\text{-}C_4H_9\text{—}C_6H_4O)_3P$, $(3\text{-}t\text{-}C_4H_9\text{—}C_6H_4O)_3P$, $(4t\text{-}C_4H_9\text{—}C_6H_4O)_3P$, $(2\text{-}CH_3\text{—}C_6H_4O)_3P$, $(3\text{-}CH_3\text{—}C_6H_4O)_3P$, $(2\text{-}CH_3\text{-}6\text{-}t\text{-}C_4H_9\text{—}C_6H_3O)_3P$, $(3\text{-}CH_3\text{-}6t\text{-}C_4H_9\text{—}C_6H_3O)_3P$, $(3\text{-}CH_3\text{-}6\text{-}t\text{-}C_4H_9\text{—}C_6H_3O)_3P$, $(2,6\text{Di-}t\text{-}C_4H_9\text{—}C_6H_3O)_3P$, $(2,3\text{-di-}t\text{-}C_4H_9\text{—}C_6H_3O)_3P$, $(2,4\text{-di-}t\text{-}C_4H_9\text{—}C_6H_3O)_3P$, $(4\text{-}CH_3\text{—}C_6H_4O)_3P$, and phosphites of the formula

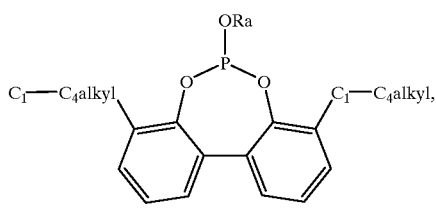

wherein Ra is $C_1$–$C_6$alkyl, cyclohexyl, benzyl, or phenyl which is unsubstituted or substituted by 1 or 2 $C_1$–$C_4$alkyl.

Particularly preferred phosphines are tri-i-propylphosphine, tri-t-butylphosphine and tricyclopentyl- and tricyclohexylphosphine.

Organic or inorganic compounds, atoms or ions coordinated to a metal center are designated as ligands for the ruthenium and osmium compounds to be used according to the invention.

Ligands which are particularly advantageously used in the context of the present invention are, for example, chosen from the group consisting of ligands (A) consisting of nitrogen ($N_2$); monocyclic, polycyclic or fused arenes which have 6 to 24, preferably 6 to 18, and particularly preferably 6 to 12 C atoms and are unsubstituted or substituted by OH, $C_1$–$C_4$alkyl, $C_1$–$C_4$alkoxy, $C_6$–$C_{12}$aryl or halogen; monocyclic heteroarenes which are unsubstituted or substituted by $C_1$–$C_4$alkyl, $C_1$–$C_4$alkoxy or halogen; fused heteroarenes; fused arene-heteroarenes having 3 to 22, preferably 4 to 16, and in particular 4 to 10 C atoms and 1 to 3 heteroatoms chosen from the group consisting of O, S and N; and aliphatic, cycloaliphatic, aromatic or araliphatic nitriles which have 1 to 22, preferably 1 to 18, particularly preferably 1 to 12, and especially preferably 1 to 7 C atoms and are unsubstituted or substituted by $C_1$–$C_4$alkyl, $C_1$–$C_4$alkoxy or halogen. The preferred substituents are methyl, ethyl, methoxy, ethoxy, fluorine, chlorine and bromine. The arenes and heteroarenes are preferably substituted by 1 to 3 radicals. Among the heteroarenes, the electron-rich heteroarenes are preferred.

Some examples of arenes and heteroarenes are benzene, cumene, biphenyl, napthalene, anthracene, acenaphthene, fluorene, phenanthrene, pyrene, chrysene, fluoroanthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazines, thianthrene and purine. Preferred arenes and heteroarenes are unsubstituted or substituted benzene, napthalene, cumene, thiophene and benzothiophene. The arene is especially preferably benzene or a benzene substituted by 1 to 3 $C_1$–$C_4$alkyl, for example toluene, xylene, trimethylbenzene, isopropylbenzene, tert-butylbenzene or cumene. The heteroarene is preferably thiophene.

The nitriles can be substituted, for example, by methoxy, ethoxy, fluorine or chlorine; the nitriles are preferably unsubstituted. The alkyl nitrites are preferably linear. Some examples of nitriles are acetonitrile, propionitrile, butyronitrile, pentylnitrile, hexylnitrile, cyclopentyl and cyclohexylnitrile, benzonitrile, methylbenzonitrile, benzylnitrile and naphthyinitrile. The nitriles are preferably linear $C_1$–$C_4$alkylnitriles or benzonitrile. Of the alkylnitriles, acetonitrile is particularly preferred.

In a preferred sub-group, the ligands of group (A) are $N_2$, benzene which is unsubstituted or substituted by one to three $C_1$–$C_4$alkyl, thiophene, benzonitrile or acetonitrile.

If appropriate, further ligands are present, for example chosen from the group consisting of ligands (B) consisting of solvating inorganic and organic compounds which contain the heteroatoms O, S or N and are often also used as solvents; and cyclopentadienyl or indenyl which are unsubstituted or substituted by $C_1$–$C_4$alkyl, $C_1$–$C_4$alkoxy, $(C_1$–$C_4$alkyl$)_3$Si or $(C_1$–$C_4$alkyl$)_3$SiO. Examples of such compounds are $H_2O$, $H_2S$ and $NH_3$; optionally halogenated, in particular fluorinated or chlorinated, aliphatic or cycloaliphatic alcohols or mercaptans having 1 to 18, preferably 1 to 12, and particularly preferably 1 to 6 C atoms, aromatic alcohols or thiols having 6 to 18, preferably 6 to 12 C atoms, or araliphatic alcohols or thiols having 7 to 18, preferably 7 to 12 C atoms; open-chain or cyclic and aliphatic, araliphatic or aromatic ethers, thioethers, sulfoxides, sulfones, ketones, aldehydes, carboxylic acid esters, lactones, optionally N-$C_1$–$C_4$-mono- or -dialkylated carboxylic acid amides having 2 to 20, preferably 2 to 12, and in particular 2 to 6 C atoms, and optionally N-$C_1$–$C_4$alkylated lactams; open-chain or cyclic and aliphatic, araliphatic or aromatic, primary, secondary and tertiary amines having 1 to 20, preferably 1 to 12, and particularly preferably 1 to 6 C atoms; and cyclopentadienyl, for example cyclopentadienyl, indenyl and mono- or polymethylated or -trimethylsilylated cyclopentadienyls or indenyls. Examples are also allyl, metallyl and crotyl.

Further examples of the group of ligands (B) are methanol, ethanol, n- and i-propanol, n-, i- and t-butanol, 1,1,1-trifluoroethanol, bistrifluoromethylmethanol, tristrifluoromethylmethanol, pentanol, hexanol, methyl- or ethylmercaptan, cyclopentanol, cyclohexanol, cyclohexylmercaptan, phenol, methylphenol, fluorophenol, phenylmercaptan, benzylmercaptan, benzyl alcohol, diethyl ether, dimethyl ether, diisopropyl ether, di-n- or di-t-butyl ether, tetrahydrofuran, tetrahydropyran, dioxane, diethyl thioether, tetrahydrothiophene, dimethyl sulfoxide, diethyl sulfoxide, tetra- and pentamethylene sulfoxide, dimethyl sulfone, diethyl sulfone, tetra- and pentamethylene sulfone, aceton, methyl ethyl ketone, diethyl ketone, phenyl methyl ketone, methyl isobutyl ketone, benzyl methyl ketone, acetaldehyde, propionaldehyde, trifluoroacetaldehyde, benzaldehyde, ethyl acetate, butyrolactone, dimethylformamide, dimethylacetamide, pyrrolidone and N-methylpyrrolidone, indenyl, cyclopentadienyl, methyl- or dimethyl- or pentamethylcyclopentadienyl and trimethylsilylcyclopentadienyl.

The primary amines can correspond to the formula $R_{29}NH_2$, the secondary amines can correspond to the formula $R_{29}R_{30}NH$ and the tertiary amines can correspond to the formula $R_{29}R_{30}R_{31}N$, wherein $R_{29}$ is $C_1$–$C_{18}$alkyl, $C_5$- or $C_6$cycloalkyl which is unsubstituted or substituted by $C_1$–$C_4$alkyl or $C_1$–$C_4$alkoxy, or $C_6$–$C_{18}$aryl or $C_1$–$C_{12}$aralkyl which is unsubstituted or substituted by $C_1$–$C_4$alkyl or $C_1$–$C_4$alkoxy, $R_{30}$ independently has the meaning of $R_{29}$, or $R_{29}$ and $R_{30}$ together are tetramethylene, pentamethylene, 3oxa-1,5-pentylene or —$CH_2$—$CH_2$—NH—$CH_2$—$CH_2$— or —$CH_2$—$CH_2$—N($C_1$–$C_4$alkyl)-$CH_2$–$CH_2$—, and $R_{31}$ independently has the meaning of $R_{29}$. The alkyl preferably contains 1 to 12, and particularly preferably 1 to 6 C atoms. The aryl preferably contains 6 to 12 C atoms and the aralkyl preferably contains 7 to 9 C atoms. Examples of amines are methyl-, dimethyl-, trimethyl-, ethyl-, diethyl-, triethyl-, methylethyl-, dimethylethyl, n-propyl-, di-n-propyl-, tri-n-butyl-, cyclohexyl-, phenyl- and benzylamine, and pyrrolidine, N-methylpyrrolidine, piperidine, piperazine, morpholine and N-methylmorpholine.

In a preferred sub-group, the ligands of group (B) are $H_2O$, $NH_3$, unsubstituted or partly or completely fluorinated $C_1$–$C_4$alkanols or cyclopentadienyl, indenyl, allyl, metallyl or crotyl. $H_2O$, $NH_3$, cyclopentadienyl, indenyl, methanol and ethanol are especially preferred.

In a preferred embodiment, the Ru and Os catalysts to be used according to the invention contain arenes or heteroarenes as ligands, phosphine groups and anions for charge balancing. They especially preferably contain an arene group as a ligand, a tertiary phosphine group and mono- or divalent anions for charge balancing.

Suitable anions of inorganic or organic acids are, for example, hydride ($H^\ominus$), halide (for example $F^\ominus$, $Cl^\ominus$, $Br^\ominus$ and $I^\ominus$), the anion of an oxygen acid, and $BF_4^\ominus$, $PF_6^\ominus$, $SbF_6^\ominus$ or $AsF_6^\ominus$. It should be mentioned that the above-mentioned ligands cyclopentadienyl, indenyl, allyl, metallyl and crotyl are anionic and thus also serve for charge balancing.

Other suitable anions are $C_1$–$C_{12}$-, preferably $C_1$–$C_6$-, and particularly preferably $C_1$–$C_4$alcoholates, which, in particular, are branched and, for example, correspond to the formula $R_xR_yR_zC$—$O^\ominus$, wherein $R_x$ is H or $C_1$–$C_{10}$alkyl, $R_y$ is $C_1$–$C_{10}$alkyl and $R_z$ is $C_1$–$C_{10}$alkyl or phenyl, and the sum of the C atoms of $R_x$, $R_y$ and $R_z$ is 11. Examples are, in particular, i-propyloxy and t-butyloxy.

Other suitable anions are $C_3$–$C_{18}$-, preferably $C_5$–$C_{14}$-, and particularly preferably $C_5$–$C_{12}$acetylides, which can correspond to the formula $R_w$—C≡C$^\ominus$ wherein $R_w$ is $C_1$–$C_{16}$alkyl, preferably α-branched $C_3$–$C_{12}$alkyl, for example formula $R_xR_yR_zC$—, or are phenyl or benzyl which are unsubstituted or substituted by 1 to 3 $C_1$–$C_4$alkyl or $C_1$–$C_4$alkoxy. Some examples are i-propyl-, i- and t-butyl-, phenyl-, benzyl-, 2-methyl-, 2,6-dimethyl-, 2-i-propyl-, 2-i-propyl-6methyl-, 2-t-butyl-, 2,6-di-t-butyl- and 2-methyl-6-t-butylphenylacetylide.

The anions of oxygen atoms can be, for example, sulfate, phosphate, perchlorate, perbromate, periodate, antimonate, arsenate, nitrate, carbonate, the anion of a $C_1$–$C_8$carboxylic acid, for example formate, acetate, propionate, butyrate, benzoate, phenyl acetate or mono, di- or trichloro- or -fluoroacetate, sulfonates, for example methylsulfonate, ethylsulfonate, propylsulfonate, butylsulfonate, trifluoromethylsulfonate (triflate) or phenylsulfonate or benzylsulfonate which are optionally substituted by $C_1$–$C_4$alkyl, $C_1$–$C_4$alkoxy or halogen, in particular fluorine, chlorine or bromine, for example tosylate, mesylate, brosylate, p-methoxy- or p-ethoxyphenylsulfonate, pentafluorophenylsulfonate or 2,4,6-triisopropylsulfonate and phosphonates, for example methylphosphonate, ethylphosphonate, propylphoshonate, butylphosphonate, phenylphosphonate, p-methylphenylphosphonate or benzylphosphonate.

$H^\ominus$, $F^\ominus$, $Cl^\ominus$, $Br^\ominus$, $BF_4^\ominus$, $PF_6^\ominus$, $SbF_6^\ominus$, $AsF_6^\ominus$, $CF_3SO_3^\ominus$, $C_6H_5$—$SO_3^\ominus$, 4-methyl-$C_6H_5$—$SO_3^\ominus$, 3,5-dimethyl-$C_6H_5$—$SO_3^\ominus$, 2,4,6-trimethyl-$C_6H_5$—$SO_3^\ominus$ and 4-$CF_3$—$C_6H_5$—$SO_3^\ominus$ and cyclopentadienyl ($Cp^\ominus$) are particularly preferred.

In a preferred embodiment, the ruthenium and osmium compounds correspond to one of the formulae VII to VIId

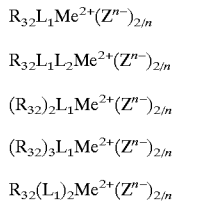

$R_{32}L_1Me^{2+}(Z^{n-})_{2/n}$ (VII), $R_{32}L_1L_2Me^{2+}(Z^{n-})_{2/n}$ (VIIa), $(R_{32})_2L_1Me^{2+}(Z^{n-})_{2/n}$ (VIIb), $(R_{32})_3L_1Me^{2+}(Z^{n-})_{2/n}$ (VIIc), $R_{32}(L_1)_2Me^{2+}(Z^{n-})_{2/n}$ (VIId)

wherein
$R_{32}$ is a phosphine ligand of the formula VI or VIa;
Me is Ru or Os;
n is the numbers 1, 2 or 3;
Z is the anion of an inorganic or organic acid;
(a) $L_1$ is a ligand of group A, wherein the $L_1$ in formula VIId are optionally different, and
(b) $L_2$ is a ligand of group B.

The preference is stated above for the individual meanings applied to $R_{32}$, $L_1$ and $L_2$.

In the formulae VII to VIId, n is preferably 1 or 2, and especially 1. The preferences stated for the phosphine ligands of the formulae VI and VIa applied to $R_{32}$, and in particular these are tertiary phosphines.

Ruthenium or osmium compounds which are especially preferably used in the process according to the invention are those of one of the formulae VIII to VIIId

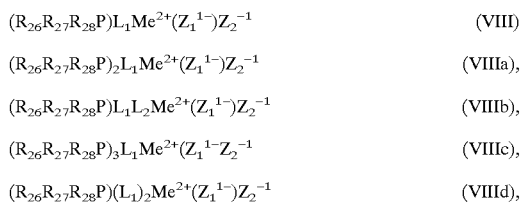

$(R_{26}R_{27}R_{28}P)L_1Me^{2+}(Z_1^{1-})Z_2^{-1}$ (VIII)

$(R_{26}R_{27}R_{28}P)_2L_1Me^{2+}(Z_1^{1-})Z_2^{-1}$ (VIIIa), $(R_{26}R_{27}R_{28}P)L_1L_2Me^{2+}(Z_1^{1-})Z_2^{-1}$ (VIIIb), $(R_{26}R_{27}R_{28}P)_3L_1Me^{2+}(Z_1^{1-}Z_2^{-1}$ (VIIIc), $(R_{26}R_{27}R_{28}P)(L_1)_2Me^{2+}(Z_1^{1-})Z_2^{-1}$ (VIIId), wherein
Me is Ru or Os;
$Z_1$ and $Z_2$ independently of one another are $H^\ominus$, cyclopentadienyl, $Cl^\ominus$, $Br^\ominus$, $BF_4^\ominus$, $PF_6^\ominus$, $SbF_6^\ominus$, $AsF_6^\ominus$, $CF_3SO_3^\ominus$, $C_6H_5$—$SO_3^\ominus$, 4-methyl-$C_6H_5$—$SO_3^\ominus$, 3,5-dimethyl-$C_6H_5$—$SO_3^\ominus$, 2,4,6trimethyl-$C_6H_5$—$SO_3^\ominus$ or 4-$CF_3$7$C_6H_5$—$SO_3^\ominus$;

$R_{26}$, $R_{27}$ and $R_{28}$ independently of one another are $C_1$–$C_6$alkyl, cyclopentyl or cyclohexyl or cyclopentyloxy or cyclohexyloxy which are unsubstituted or substituted by 1 to 3 $C_1$–$C_4$alkyl, or phenyl or benzyl or phenyloxy or benzyloxy which are unsubstituted or substituted by 1 to 3 $C_1$–$C_4$alkyl; $L_1$ is $C_6$–$C_{16}$-arene or $C_5$–$C_{16}$heteroarene which are unsubstituted or substituted by 1 to 3 $C_1$–$C_4$alkyl, $C_1$–$C_4$alkoxy, —OH, —F or Cl, or $C_1$–$C_6$alkyl-CN, benzonitrile or benzylnitrile, wherein the $L_1$ in formula VIIId are optionally different; and $L_2$ is $H_2O$ or $C_1$–$C_6$alkanol.

If the preparation of the ruthenium and osmium catalysts is carried out in solvents which can coordinate to a metal atom, for example alkanols, solvated Ru/Os cation complexes can be formed, and are also included in the context of the use according to the invention.

Some examples of ruthenium and osmium compounds to be used according to the invention are [tos is tosylate]:

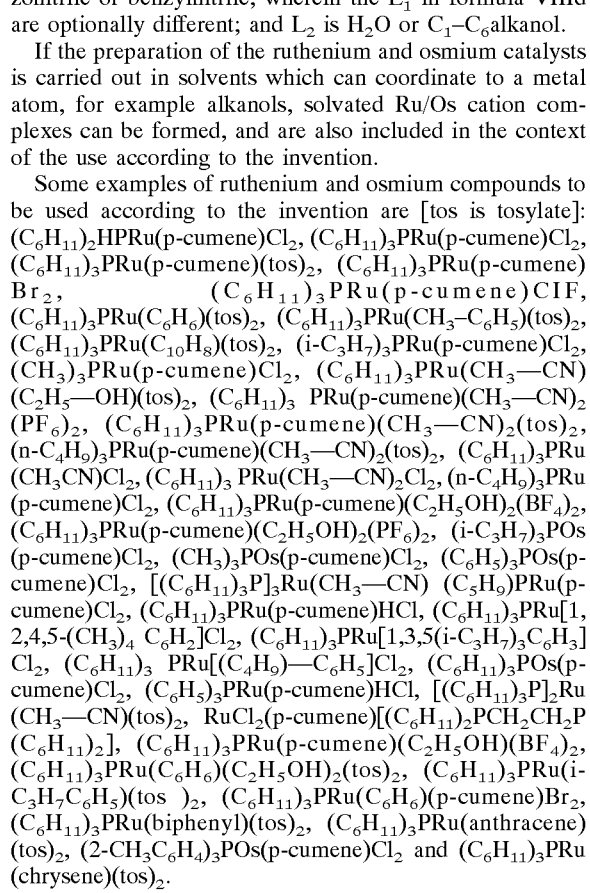

$(C_6H_{11})_2HPRu(p-cumene)Cl_2$, $(C_6H_{11})_3PRu(p-cumene)Cl_2$, $(C_6H_{11})_3PRu(p-cumene)(tos)_2$, $(C_6H_{11})_3PRu(p-cumene)Br_2$, $(C_6H_{11})_3PRu(p-cumene)ClF$, $(C_6H_{11})_3PRu(C_6H_6)(tos)_2$, $(C_6H_{11})_3PRu(CH_3-C_6H_5)(tos)_2$, $(C_6H_{11})_3PRu(C_{10}H_8)(tos)_2$, $(i-C_3H_7)_3PRu(p-cumene)Cl_2$, $(CH_3)_3PRu(p-cumene)Cl_2$, $(C_6H_{11})_3PRu(CH_3-CN)(C_2H_5-OH)(tos)_2$, $(C_6H_{11})_3PRu(p-cumene)(CH_3-CN)_2(PF_6)_2$, $(C_6H_{11})_3PRu(p-cumene)(CH_3-CN)_2(tos)_2$, $(n-C_4H_9)_3PRu(p-cumene)(CH_3-CN)_2(tos)_2$, $(C_6H_{11})_3PRu(CH_3CN)Cl_2$, $(C_6H_{11})_3PRu(CH_3-CN)_2Cl_2$, $(n-C_4H_9)_3PRu(p-cumene)Cl_2$, $(C_6H_{11})_3PRu(p-cumene)(C_2H_5OH)_2(BF_4)_2$, $(C_6H_{11})_3PRu(p-cumene)(C_2H_5OH)_2(PF_6)_2$, $(i-C_3H_7)_3POs(p-cumene)Cl_2$, $(CH_3)_3POs(p-cumene)Cl_2$, $(C_6H_5)_3POs(p-cumene)Cl_2$, $[(C_6H_{11})_3P]_3Ru(CH_3-CN)$ $(C_5H_9)PRu(p-cumene)Cl_2$, $(C_6H_{11})_3PRu(p-cumene)HCl$, $(C_6H_{11})_3PRu[1,2,4,5-(CH_3)_4 C_6H_2]Cl_2$, $(C_6H_{11})_3PRu[1,3,5-(i-C_3H_7)_3C_6H_3]Cl_2$, $(C_6H_{11})_3 PRu[(C_4H_9)-C_6H_5]Cl_2$, $(C_6H_{11})_3POs(p-cumene)Cl_2$, $(C_6H_5)_3PRu(p-cumene)HCl$, $[(C_6H_{11})_3P]_2Ru(CH_3-CN)(tos)_2$, $RuCl_2(p-cumene)[(C_6H_{11})_2PCH_2CH_2P(C_6H_{11})_2]$, $(C_6H_{11})_3PRu(p-cumene)(C_2H_5OH)(BF_4)_2$, $(C_6H_{11})_3PRu(C_6H_6)(C_2H_5OH)_2(tos)_2$, $(C_6H_{11})_3PRu(i-C_3H_7C_6H_5)(tos )_2$, $(C_6H_{11})_3PRu(C_6H_6)(p-cumene)Br_2$, $(C_6H_{11})_3PRu(biphenyl)(tos)_2$, $(C_6H_{11})_3PRu(anthracene)(tos)_2$, $(2-CH_3C_6H_4)_3POs(p-cumene)Cl_2$ and $(C_6H_{11})_3PRu(chrysene)(tos)_2$.

The ruthenium and osmium compounds to be used according to the invention are known or can be prepared by known and analogous processes starting from the metal halides (for example $MeX_3$ or $[MeareneX_x]_2$ and reaction with phopshines and ligand-forming agents.

The composition according to the invention can comprise inert solvents. It is a particular advantage that in the case of liquid monomers, a metathesis polymerization can be carried out without the use of a solvent. Another advantage is that the polymerization itself can be carried out in water, polar and protic solvents or water/solvent mixtures. In these cases, it is advantageous in the context of the present invention to use a surfactant.

Suitable inert solvents are, for example, protic-polar and aprotic solvents, which can be used by themselves or in mixtures of at least two solvents. Examples are: ethers (dibutyl ether, tetrahydrofuran, dioxane, ethylene glycol monomethyl or dimethyl ether, ethylene glycol monoethyl or diethyl ether, diethylene glycol diethyl ether and triethylene glycol dimethyl ether), halogenated hydrocarbons (methylene chloride, chloroform, 1,2-dichloroethane, 1,1,1-trichloroethane and 1,1,2,2-tetrachloroethane), carboxylic acid esters and lactones (ethyl acetate, methyl propionate, ethyl benzoate, 2-methoxyethyl acetate, γ-butyrolactone, δ-valerolactone and pivalolactone), carboxylic acid amides and lactams (N,N-dimethylformamide, N,N-diethylformamide, N,N-dimethylacetamide, tetramethylurea, hexamethylphosphoric acid triamide, γ-butyrolactam, ε-caprolactam, N-methylpyrrolidone, N-acetylpyrrolidone and N-methylcaprolactam), sulfoxides (dimethyl sulfoxide), sulfones (dimethyl sulfone, diethyl sulfone, trimethylene sulfone and tetramethylene sulfone), tertiary amines (N-methylpiperidine and N-methylmorpholine), aliphatic and aromatic hydrocarbons, for example petroleum ether, pentane, hexane, cyclohexane, methylcyclohexane, benzene or substituted benzenes (chlorobenzene, o-dichlorobenzene, 1,2,4-trichlorobenzene, nitrobenzene, toluene and xylene), and nitrites (acetonitrile, propionitrile, benzonitrile and phenylacetonitrile). Preferred solvents are aprotic polar and non-polar solvents.

Preferred solvents are aliphatic and aromatic hydrocarbons and mixtures of such solvents.

It is to be particularly emphasized that the composition according to the invention comprising a DCPD, if appropriate a cycloolefin and a catalyst is often insensitive to oxygen and moisture, which allows storage and a reaction procedure without an inert gas.

Catalytic amounts in the context of the present invention preferably means an amount of 0.001 to 20 mol %, particularly preferably 0.01 to 15 mol %, and especially preferably 0.01 to 10 mol %, based on the amount of monomer. Amounts of 0.001 to 2 mol % are especially preferred because of the high thermocatalytic activity.

The composition according to the invention used for the polymerization can be prepared directly before the polymerization or used as a preformulated mixture, since the catalysts used have a particularly high stability. The mixture can even be stored for a relatively long time as a ready-to-use formulation before the polymerization, which is of advantage for use on a large industrial scale.

The composition according to the invention can comprise formulation auxiliaries. Known auxiliaries are antistatics, antioxidants, light stabilizers, plasticizers, dyes, pigments, fillers, reinforcing fillers, lubricants, adhesion promoters, viscosity-increasing agents and mold release auxiliaries. The auxiliaries can be present in surprisingly high proportions without adversely influencing the polymerization, for example in amounts of up to 70% by weight, preferably 1 to 70% by weight, more preferably 5 to 60% by weight, particularly preferably 10 to 50% by weight, and especially preferably 10 to 40% by weight, based on the composition. A very large number of auxiliaries for improving the optical, physical, mechanical and electrical properties have been disclosed. Some examples are glass and quartz in the form of powders, beads and fibers, metal and semimetal oxides, carbonates, such as $MgCO_3$, $CaCO_3$ and dolomite, metal sulfates, such as gypsum and barite, naturally occurring and synthetic silicates, such as talc, zeolites, wollastonite and felspars, aluminas, such as china clay, rock powders, whiskers, carbon fibers, fibers or powders of plastics and carbon black. Viscosity-increasing agents are, in particular, metathesis polymers which contain olefinically unsaturated groups and can be incorporated into the polymer during the polymerization. Such metathesis polymers are known and are commerically obtainable, for example, under the trade name Vestenamere®. Other viscosity-increasing agents are polybutadiene, polyisoprene or polychlorobutadiene, as well as copolymers of butadiene, isoprene and chloroprene with olefins.

The invention furthermore relates to a process for the preparation of metathesis polymers, which is characterized in that a composition of (a) dicyclopentadiene, by itself or in a mixture with a strained cycloolefin, and (b) a catalytic amount of at least one carbene-free, divalent-cationic ruthenium or osmium compound as a single-component catalyst which contains at least one phosphine group and a total of 2 to 5 ligands bonded to the metal atom, and which contains acid anions for charge balancing, is heated.

The process according to the invention is preferably carried out at a temperature of at least 50° C., and more preferably at least 60° C. In particular, the process according to the invention is carried out at temperatures of 60 to 300° C., preferably 60 to 250° C., particularly preferably 60 to 200° C., and especially preferably 70 to 160° C. After the polymerization, it may be advantageous to after-heat the polymers at elevated temperatures, for example 80 to 200° C.

To prepare linear polymers, the reaction is preferably carried out in dilute solutions.

The polymerization can be combined with shaping processes, for example calendering, casting, compression molding, injection molding or extrusion processes. Materials for production of shaped articles by cutting or thermoplastically deformable materials for production of all types of shaped articles, and coatings can be prepared using the process according to the invention. The shaping and polymerization are advantageously combined in solvent-free reactive systems, it being possible to use processing processes such as, for example, injection molding, extrusion and polymerization in predetermined molds (if appropriate under pressure).

The polymers prepared according to the invention can be homopolymers or copolymers with random distribution of the structural units, graft polymers or block polymers, as well as crosslinked polymers of this type. They can have an average molecular weight ($\overline{Mw}$) of, for example, 500 to 2 million dalton, preferably 1000 to 1 million dalton (determined by GPC by comparison with polystyrene standards of narrow distribution).

It has been found, surprisingly, that the polymerization in a solvent leads in high yields to a linear polydicylcopentadiene, a polymer having structural elements of the formula IX

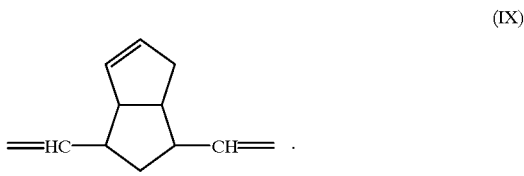

(IX)

The invention furthermore relates to linear copolymers with structural elements of the formula IX and structural elements of the formula X

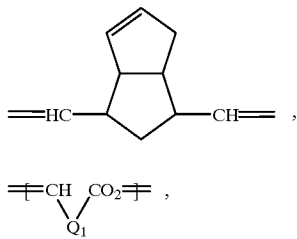

(IX)

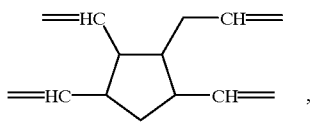

(X)

and crosslinked copolymers, in particular with structural elements of the formulae IX, X and XI (XI)

wherein $Q_1$ and $Q_2$ have the abovementioned meanings, including the preferences. The non-crosslinked or linear polymers include oligomers and polymers and can contain, for example, 5 to 5000, advantageously 10 to 2000, preferably 20 to 1000, particularly preferably 20 to 500, and especially preferably 20 to 300 structural units. If the polymers are processed further, lower molecular weights are preferred, and polymers with high molecular weights are advantageously used for processing to moldings.

The invention also relates to polymers which are obtainable by the process according to the invention.

Among the polymers, those which contain only carbon and hydrogen are preferred.

The polymers according to the invention can have very different properties, depending on the nature and amount of monomers used. Some are distinguished by a very high permeability to oxygen, outstanding dielectric properties (low dielectric constants, low loss factors or tans values) good heat stability (glass transition temperatures above 100° C.), high toughnesses (impact strength and notched impact strength), flexibility and mechanical strength (breaking strength), hardness and low absorption of water. Others have outstanding optical properties, for example a high transparency and low refractive indices. The low shrinkage and the excellent surface properties (smoothness, gloss, adhesion) are furthermore to be singled out in particular. They can therefore be used in very different industrial fields.

The compositions according to the invention are distinguished by a high adhesive strength as coats on the surfaces of carrier materials. The coated materials are furthermore distinguished by a very high surface smoothness and gloss. Among the good mechanical properties, the low shrinkage and the high impact strength are to be singled out in particular, as well as the heat resistance. The easy removal from the mold and the high resistance to solvents are furthermore to be mentioned. The surfaces can be modified further, for example painted or printed on, and the high adhesive strength of the paints should also be mentioned here.

The polymers obtainable according to the invention are suitable for the production of medical equipment, implants or contact lenses; for the production of electrical (coil embedding) and electronic components; as binders for paints; as thermosetting compositions for model construction or as adhesives for gluing substrates with low surface energies (for example Teflon, polyethylene and polypropylene), and as a thermopolymerizable composition in stereolithography. The compositions according to the invention can also be used for the preparation of paints by thermopolymerization, it being possible to use on the one hand clear (transparent) and even pigmented compositions. Both white and colored pigments can be used. The production of shaped articles by thermoplastic shaping processes for all types of articles of daily use is furthermore to be mentioned.

The compositions according to the invention are particularly suitable for the production of protective layers. The invention furthermore relates to a variant of the process according to the invention for the production of coated materials in which a composition of (a) dicyclopentadiene, by itself or in a mixture with a strained cycloolefin, (b) catalyst and, if appropriate, solvent is applied as a layer to a carrier, for example by dipping, brushing, pouring, rolling, knife-coating or whirler-coating processes, the solvent is removed, if appropriate, and the layer is heated for polymerization. Surfaces of substrates can be modified or protected with this process (corrosion protection).

The present invention furthermore relates to a carrier material which is coated with an oligomer or polymer according to the invention and comprises a crosslinking agent. These materials are suitable for the production of protective layers or relief images by heating and subsequent development with a solvent. Suitable crosslinking agents, which the materials may comprise, for example, in an amount of 0.01 to 20% by weight, are, in particular, organic bisazides, in particular commercially obtainable 2,6-bis(4-azidobenzylidene)-4methylcyclohexanone.

The present invention furthermore relates to a coated carrier material, which is characterized in that a layer of a composition according to the invention is applied to a substrate.

The present invention also relates to a coated substrate with a hardened layer of the composition according to the invention.

Suitable substrates (carrier materials) are, for example, those of glass, minerals, ceramics, plastics, wood, semimetals, metals, metal oxides and metal nitrides. The layer thicknesses essentially depend on the desired use and can be, for example, 0.1 to 1000 μm, preferably 0.5 to 500 μm, particularly preferably 1 to 100 μm. The coated materials are distinguished by a high adhesive strength and good thermal and mechanical properties.

The coated materials according to the invention can be produced by known methods, for example brushing, knife-coating and casting processes, such as curtain coating or whirler coating.

Particularly good results are often achieved in coatings if cycloolefins which additionally contain 1 to 3, and preferably 1 further double bond and which are polycyclic condensed ring systems in the context of the invention are additionally used for the thermal metathesis polymerization.

The following examples illustrate the invention further.

EXAMPLES 1 to 12

Dicyclopentadiene (distilled or technical grade) and, if appropriate, a comonomer (additive) are mixed, and (p-cumene)RuCl$_2$[P(C$_6$H$_{11}$)$_3$] as the catalyst, is dissolved, with gentle heating. If appropriate, Vestenamer® or di-t-butyl-p-cresol (BHT) is added and the mixture is degassed in vacuo at 50–60° C. The mixture is poured into molds and cured by means of heat. The glass transition temperature is determined by differential scanning analysis. The swelling in toluene is stated in percent of the weight uptake of toluene. Further data are found in Table 1.

TABLE 1

| Exp. | DCPD | Additive | Catalyst | Curing | $T_g$ | Swelling |
|------|------|----------|----------|--------|-------|----------|
| 1 | dist. |  | 0.5 | a, b, c | 119 | 105 |
| 2 | dist. 90% | 10 2-N | 0.5 | a, b, c | 90 | 107 |
| 3 | dist. 50% | 50 2-N | 0.5 | a, b, c | 70 | 156 |
| 4 | dist. 99% | 1 BHT | 0.5 | a, b, c | 111 | 100 |
| 5 | dist. |  | 0.3 | a, b, c | 120 | 102 |
| 6 | dist. 90.9% | 9.1 PO | 0.5 | a, b, c | 11 | 128 |
| 7 | dist. 83% | 17 PO | 0.5 | a, b, c, d | 125 | 170 |
| 8 | 95.2% | 4.8 PN | 0.5 | a, b, c | 94 | 109 |
| 9 | 90% | 10 2-N | 0.5 | a, b, c | 90 | 107 |
| 10 | 50% | 50 2-N | 0.5 | a, b, c | 70 | 156 |
| 11 | n.dist. |  | 0.5 | a, b, c | 110 | 76 |
| 12 | n.dist. |  | 0.3 | a, b, c | 98 | 88 |
| 13 | n.dist. |  | 0.3 | a, b, c, d | 110 | 70 | n.dist.: not distilled; additive: amount in %; BHT: di-t-butyl-o¶-cresol; PO: Vestenamer ®; PN: polynorbornene; 2-N: 2-norbornene; ND: norbornadiene; catalyst: amount (%) based on DCPD; curing: a: 1 hour/80° C.; b: 1 hour/100° C.; c: 2 hours/120° C.; d: 2 hours/150° C.; $T_g$: ° C.; swelling: (%)

EXAMPLES 14 TO 21

The procedure is as in Example 1, and the filler stated in Table 2 is additionally co-used. Curing is carried out for 1 hour at 80° C., followed by 1 hour at 100° C. and 2 hours at 120° C. The amount of catalyst is 0.5% by weight, based on DCPD. Further data are found in Table 2.

TABLE 2

| Exp. | DCPD | Additive | Filler | $T_g$ | Swelling |
|------|------|----------|--------|-------|----------|
| 14 | dist. 95% |  | 5 Aerosil 380 (SiO$_2$) | — | — |
| 15 | dist. 57% | 3 PN | 40 Al$_2$O$_3$ powder | 92 | 52 |
| 16 | dist. 48.5% | 1.5 PN | 50 aluminum hydroxide | — | — |
| 17 | dist.48.5% | 1.5 PN | 50 talc | 103 | 52 |
| 18 | dist. 48.5% | 1.5 PN | 50 aluminum grit | 92 | 60 |
| 19 | dist. 30% | 1.5 PN | 70 quartz flour K8 | 90 | 43 |
| 20 | n.dist. 25% |  | 75 DT 082 | 101 | 42 |
| 21 | n.dist. 99.5% |  | 0.5 Aerosil 350 | — | — | n.dist.: not distilled; additive: amount in %; PN: polynorbornene; filler: amount (%); aluminum hydroxide: (DT 082); $T_g$: ° C.; swelling: (%)

EXAMPLE 22

190 g of technical grade dicyclopentadiene (Shell) and 950 mg of $(C_6H_{11})_3PRu(p\text{-cumene})Cl_2$ are mixed and the mixture is heated at 90° C. for 4 hours, followed by 120° C. for 1 hour and then 150° C. for 4 hours. The resulting polymer has the following properties: $T_g$: 119° C.; weight loss at 300° C.: 5.3%; flexural strength: 102.6 Nmm$^{-2}$; edge fiber elongation: 6.7%; E modulus: 2100 Nmm$^{-2}$; $K_{IC}$: 3.62 Jm$^{-2}$; $G_{IC}$: 5320 Jm$^{-2}$; impact strength: 83.5 kJm$^{-2}$; $\epsilon$ (45 Hz, room temperature): 2.4; $\epsilon$ (45 Hz, 200° C.): 2.4; $\epsilon$ (1 kHz, room temperature): 2.4; $\epsilon$ (1 kHz, 200° C.): 2.4; tan $\delta$ (%, 45 Hz, room temperature): 0.1; tan $\delta$ (%, 45 Hz, 200° C.): 1.0; tan $\delta$ (%, 1 kHz, room temperature): 0.1; tan $\delta$ (%, 1 kHz, 200° C.): 0.7; water uptake (14 days, 70° C.): <0.5%; electrical breakdown voltage: 41.6 kVmm$^{-2}$.

EXAMPLE 23

170 g of technical grade dicyclopentadiene (Shell), 5.1 g of poly(norbornene) and 850 mg of $(C_6H_{11})_3PRu(p\text{-cumene})Cl_2$ are mixed and the mixture is heated at 90° C. for 4 hours, followed by 120° C. for 1 hour and then at 150° C. for 4 hours. The resulting polymer has the following properties: $T_g$: 119° C.; weight loss at 300° C.: 5.3%; flexural strength: 102.3 Nmm$^{-2}$; edge fiber elongation: 6.2%; E modulus: 2200 Nmm$^{-2}$; $K_{IC}$: 3.11 Jm$^{-2}$; $G_{IC}$: 3800 Jm$^{-2}$; impact strength: 84.4 kJm$^{-2}$.

EXAMPLE 24

150 g of technical grade dicyclopentadiene (Shell), 4.5 g of poly(norbornene), 225 g of quartz flour W12 and 750 mg of $(C_6H_{11})_3PRu(p\text{-cumene})Cl_2$ are mixed and the mixture is heated at 90° C. for 4 hours, followed by 120° C. for 1 hour and then 150° C. for 4 hours. The resulting polymer has the following properties: $T_g$: 118° C.; flexural strength: 41.5 Nmm$^{-2}$; edge fiber elongation: 1.3%; E modulus: 6800 Nmm$^{-2}$; $K_{IC}$: 2.51 Jm$^{-2}$; $G_{IC}$: 847 Jm$^{-2}$; $\epsilon$ (45 Hz, room temperature): 3.2; $\epsilon$ (45 Hz, 200° C.): 7.5; $\epsilon$ (1 kHz, room temperature): 3.2; $\epsilon$ (1 kHz, 200° C.): 4.3; tan $\delta$ (%, 45 Hz, room temperature): 0.4; tan $\delta$ (%, 45 Hz, 200° C.): >20; tan $\delta$ (%, 1 kHz, room temperature): 0.1; tan $\delta$ (%, 1 kHz, 200° C.): >20; water uptake (14 days, 70° C.): about 0.2%.

EXAMPLE 25

150 g of technical grade dicyclopentadiene (Shell), 4.5 g of poly(norbornene), 279 g of quartz flour W12 and 750 mg of $(C_6H_{11})_3PRu(p\text{-cumene})Cl_2$ are mixed and the mxiture is heated at 90° C. for 4 hours, followed by 120° C. for 1 hour and then 150° C. for 4 hours. The resulting polymer has the following properties: $T_g$: 121° C.; flexural strength: 46.0 Nmm$^{-2}$; edge fiber elongation: 1.1%; E modulus: 7800 Nmm$^{-2}$; $K_{IC}$: 3.45 Jm$^{-2}$; $G_{IC}$: 1380 Jm$^{-2}$.

EXAMPLE 26

170 g of technical grade dicyclopentadiene (Shell), 5.1 g of poly(butadiene) and 850 mg of $(C_6H_{11})_3PRu(p\text{-cumene})Cl_2$ are mixed and the mixture is heated at 90° C. for 4 hours, followed by 120° C. for 1 hour and then 150° C. for 4 hours. The resulting polymer has the following properties: $T_g$: 109° C.; weight loss at 300° C.: 4.9%; Flexural strength: 87.3 Nmm$^{-2}$; edge fiber elongation: 6.3%; E modulus: 1900 Nmm$^{-2}$; $K_{IC}$: 3.36 Jm$^{-2}$; $G_{IC}$: 5050 Jm$^{-2}$; impact strength: 75,2 kJm$^{-2}$.

EXAMPLE 27

150 g of technical grade dicyclopentadiene (Shell), 4.5 g of poly(butadiene), 225 g of quartz flour W12 and 750 mg of $(C_6H_{11})_3PRu(p\text{-cumene})Cl_2$ are mixed and the mixture is heated at 90° C. for 4 hours, followed by 120° C. for 1 hour and then 150° C. for 4 hours. The resulting polymer has the following properties: $T_g$: 117° C.; flexural strength: 44.6 Nmm$^{-2}$; edge fiber elongation: 1.7%; E modulus: 6050 Nmm$^{-2}$; $K_{IC}$: 3.52 Jm$^{-2}$; $G_{IC}$: 1870 Jm$^{-2}$; impact strength: 4.60 kJm$^{-2}$.

EXAMPLE 28

80 ml of water are initially introduced into a 250 ml sulfonating flask with a thermometer, N$_2$ inlet and dropping funnel, and the flask is flushed with N$_2$. A solution of 0.5% by weight of $(C_6H_{11})_3PRu(p\text{-cumene})Cl_2$ in 30 ml of dicyclopentadiene is now added from the dropping funnel in the course of 30 seconds, with vigorous stirring, and at the same time the sulfonating flask is placed in an oil bath preheated to 120° C. (internal temperature rising to 100° C.). After 1.5 hours, the polymer formed is filtered off and dried in vacuo (0.1 mbar) at 50° C. for 24 hours. Yield: 11.0 g (36.7%).

EXAMPLE 29

12 ml of water, 160 mg of Dresinate 731 (surfactant), 8.0 g of dicyclopentadiene and 80 mg of $(C_6H_{11})_3PRu(p\text{-cumene})Cl_2$ are mixed. After the mixture has been stirred at 150° C. (bath temperature; internal temperature rising to 140° C.) for 2 hours, it is cooled and the polymer formed is precipitated in 300 ml of acetone. Yield: 1.50 g (18.8%); $T_g=117°$ C.

EXAMPLE 30

12 ml of water, 8.0 g of dicyclopentadiene and 40 mg of $(C_6H_{11})_3PRu(p\text{-cumene})Cl_2$ are mixed. After the mixture has been stirred at 150° C. (bath temperature) for 4 hours, it is cooled and the polymer formed is precipitated in 300 ml of acetone. Yield: 5.28 g (66%); $T_g=59°$ C.; elemental analysis: C, 90.85 (calculated); 88.80 (found); H, 9.14 (calculated); 9.15 (found).

EXAMPLE 31

12 ml of water, 160 mg of Triton X-100 (Fluka) (surfactant), 8.0 g of dicyclopentadiene and 40 mg of $(C_6H_{11})_3PRu(p\text{-cumene})C_{12}$ are mixed. After the mixture has been stirred at 150° C. (bath temperature) for 4 hours, it is cooled and the polymer formed is precipitated in 300 ml of acetone. Yield: 7.2 g (90%); $T_g=143°$ C.; elemental analysis: C, 90.85 (calculated); 88.70 (found); H, 9.14 (calculated); 9.26 (found).

EXAMPLE 32

12 ml of water, 160 mg of Disponil APE-256 (Henkel) (surfactant), 8.0 g of dicyclopentadiene and 40 mg of $(C_6H_{11})_3PRu(p\text{-cumene})Cl_2$ are mixed. After the mixture has been stirred at 150° C. (bath temperature) for 4 hours, it is cooled and the polymer formed is precipitated in 300 ml of acetone. Yield: 7.3 g (91%); $T_g=92°$ C.; elemental analysis: C, 90.85 (calculated); 89.08 (found); H, 9.14 (calculated); 9.21 (found).

EXAMPLE 33

24 ml of water, 320 mg of Triton X-100 (Fluka) (surfactant), 16.0 g of dicyclopentadiene and 80 mg of $(C_6H_{11})_3PRu(p\text{-cumene})Cl_2$ are mixed. After the mixture has been stirred vigorously at 120° C. (bath temperature; internal temperature rising to a maximum of 90° C.) for 4 hours, it is cooled and the polymer formed is precipitated in 300 ml of acetone. Yield: 12.54 g (78.4%); $T_g=131°$ C.; elemental analysis: C, 90.85 (calculated); 87.95 (found); H, 9.14 (calculated); 8.95 (found).

What is claimed is:

1. A composition which comprises
   (a) dicyclopentadiene, by itself or in a mixture with a strained cycloolefin, and
   (b) a catalytic amount of a ruthenium or osmium compound which corresponds to one of the formulae VII to VIId $$R_{32}L_1Me^{2+}(Z^{n-})_{2/n} \quad (VII)$$

$$R_{32}L_1L_2Me^{2+}(Z^{n-})_{2/n} \quad (VIIa)$$

$$(R_{32})_2L_1Me^{2+}(Z^{n-})_{2/n} \quad (VIIb)$$

$$(R_{32})_3L_1Me^{2+}(Z^{n-})_{2/n} \quad (VIIc)$$

$$R_{32}(L_1)_2Me^{2+}(Z^{n-})_{2/n} \quad (VIId)$$

wherein $R_{32}$ is a phosphine ligand of the formula $$PR_{26}R_{27}R_{28} \quad (VI)$$

$$R_{26}R_{27}P\text{—}Z_1\text{—}PR_{26}R_{27} \quad (VIa)$$

wherein $R_{26}$, $R_{27}$ and $R_{28}$ independently of one another are H, $C_1$–$C_{20}$alkyl, $C_1$–$C_{20}$alkoxy, $C_4$–$C_{12}$cycloalkyl or cycloalkoxy which are unsubstituted or substituted by $C_1$–$C_6$alkyl, $C_1$–$C_6$haloalkyl or $C_1$–$C_6$alkoxy, or $C_6$–$C_{16}$aryl or $C_6$–$C_{16}$aryloxy which are unsubstituted or substituted by $C_1$–$C_6$alkyl, $C_1$–$C_6$haloalkyl or $C_1$–$C_6$alkoxy, or $C_7$–$C_{16}$aralkyl or $C_7$–$C_{16}$aralkyloxy which are unsubstituted or substituted by $C_1$–$C_6$alkyl, $C_1$–$C_6$haloalkyl or $C_1$–$C_6$alkoxy; or the radicals $R_{26}$ and $R_{27}$ together are tetra- or pentamethylene or tetra- or pentamethylenedioxyl which are unsubstituted or substituted by $C_1$–$C_6$alkyl, $C_1$–$C_6$haloalkyl or $C_1$–$C_6$alkoxy, or tetra- or pentamethylene or tetra- or pentamethylenedioxyl which are unsubstituted or substituted by $C_1$–$C_6$alkyl, $C_1$–$C_6$haloalkyl or $C_1$–$C_6$alkoxy and fused with 1 or 2 1,2-phenylene, or tetramethylenedioxyl which is unsubstituted or substituted by $C_1$–$C_6$alkyl, $C_1$–$C_6$haloalkyl or $C_1$–$C_6$alkoxy and fused in the 1,2- and 3,4- positions with 1,2-phenylene, and $R_{28}$ has the abovementioned meaning; and $Z_1$ is linear or branched $C_2$–$C_{12}$alkylene which is unsubstituted or substituted by $C_1$–$C_4$alkoxy, 1,2- or 1,3-cycloalkylene which has 4 to 8 C atoms and is unsubstituted or substituted by $C_1$–$C_4$alkyl or $C_1$–$C_4$alkoxy, or 1,2- or 1,3-heterocycloalkylene which has 5 to 6 ring members and a heteroatom selected from the group consisting of O and N and is unsubstituted or substituted by $C_1$–$C_4$alkyl or $C_1$–$C_4$alkoxy, Me is Ru or Os;

n is the numbers 1, 2 or 3;

Z is the anion of an inorganic or organic acid;

$L_1$ is a ligand selected from the group A consisting of nitrogen ($N_2$); monocyclic, polycyclic or fused arenes which have 6 to 24 C atoms and are unsubstituted or substituted by OH, $C_1$–$C_4$alkyl, $C_1$–$C_4$alkoxy, $C_6$–$C_{12}$aryl or halogen; monocyclic heteroarenes which are unsubstituted or substituted by $C_1$–$C_4$alkyl, $C_1$–$C_4$alkoxy or halogen; fused heteroarenes; fused arene-heteroarenes having 3 to 22 C atoms and 1 to 3 heteroatoms selected from the group consisting of O, S and N; and aliphatic, cycloaliphatic, aromatic or aliphatic nitriles which have 1 to 22 C atoms and are unsubstituted or substituted by $C_1$–$C_4$alkyl, $C_1$–$C_4$alkoxy or halogen; and $L_2$ is a ligand selected from the group B consisting of solvating inorganic and organic compounds which contain the heteroatoms O, S or N; and cyclopentadienyl or indenyl which are unsubstituted or substituted by $C_1$–$C_4$alkyl, $C_1$–$C_4$alkoxy, $(C_1$–$C_4$alkyl$)_3$Si or $(C_1$–$C_4$alkyl$)_3$SiO.

2. Composition according to claim 1, characterized in that the ruthenium or osmium compounds contain a total of 2 or 3 of ligands $R_{32}$, $L_1$ and/or $L_2$.

3. Composition according to claim 1, characterized in that the phosphine group is a tertiary phosphine having 3 to 40 C atoms.

4. Composition according to claim 1, characterized in that the cyclic olefins are monocyclic rings or polycyclic, bridged or fused ring systems having 2 to 4 rings, which are unsubstituted or substituted, which contain one or more heteroatoms from the group consisting of O, S, N and Si in one or more rings, and which contain fused aromatic or heteroaromatic rings.

5. Composition according to claim 1, characterized in that the cyclic olefins contain 3 to 16 ring members.

6. Composition according to claim 4, characterized in that the cyclic olefins contain further non-aromatic double bonds.

7. Composition according to claim 1, characterized in that the cycloolefins correspond to the formula I

(I)

wherein $Q_1$ is a radical having at least one carbon atom which, together with the —CH=$CQ_2$-group, forms an alicyclic ring which has at least 3 members and which optionally contains one or more heteroatoms selected from the group consisting of silicon, phosphorus, oxygen, nitrogen and sulfur; and which is unsubstituted or substituted by halogen, =O, —CN, —$NO_2$, $R_1R_2R_3Si$—$(O)_u$—, —COOM, —$SO_3M$, —$PO_3M$, —$COO(M_1)_{1/2}$, —$SO_3(M_1)_{1/2}$, —$PO_3(M_1)_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—$NR_5$—CO—; or in which an alicyclic, aromatic or heteroaromatic ring, which is unsubstituted or substituted by halogen, —CN, —$NO_2$, $R_6R_7R_8Si$—$(O)_u$—, —COOM, —$SO_3M$, —$PO_3M$, —$COO(M_1)_{1/2}$, —$SO_3(M_1)_{1/2}$, —$PO_3(M_1)_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$—, is optionally fused onto adjacent carbon atoms of the alicyclic ring;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently of one another are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$R_5$ and $R_{10}$ independently of one another are hydrogen, $C_1$–$C_{12}$alkyl, phenyl or benzyl, where the alkyl groups in their turn are unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

in which the alicyclic ring formed with $Q_1$ optionally contains further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

wherein the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —$NO_2$, —CN or halogen, and where the heteroatoms of the abovementioned heterocycloalkyl, heteroaryl and heteroaralkyl groups are chosen from the group consisting of —O—, —S—, —$NR_9$— and —N=; and $R_9$ is hydrogen, $C_1$–$C_{12}$alkyl, phenyl or benzyl.

8. Composition according to claim 7, characterized in that the alicyclic ring which $Q_1$ forms together with the —CH=$CQ_2$-group contains 3 to 16 ring atoms, and wherein this is a monocyclic, bicyclic, tricyclic or tetracyclic ring system.

9. Composition according to claim 7, characterized in that $Q_2$ in formula I is hydrogen.

10. Composition according to claim 1, characterized in that the cyclic olefins are norbornene or norbornene derivatives.

11. Composition according to claim 10, characterized in that the norbornene derivatives are those of the formula II

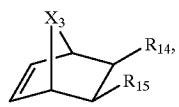

(II)

wherein $X_3$ is —$CHR_{16}$—, oxygen or sulfur;

$R_{14}$ and $R_{15}$ independently of one another are hydrogen, —CN, trifluoromethyl, $(CH_3)_3Si$—O—, $(CH_3)_3Si$— or —$COOR_{17}$; and $R_{16}$ and $R_{17}$ independently of one another are hydrogen, $C_1$–$C_{12}$alkyl, phenyl or benzyl;

or the formula III

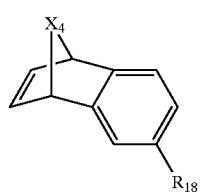

(III)

wherein $X_4$ is —$CHR_{19}$—, oxygen or sulfur;

$R_{19}$ is hydrogen, $C_1$–$C_{12}$alkyl, phenyl or benzyl; and $R_{18}$ is hydrogen, $C_1$–$C_6$alkyl or halogen;

or the formula IV

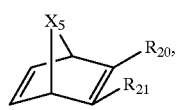

(IV)

wherein $X_5$ is —$CHR_{22}$—, oxygen or sulfur;

$R_{22}$ is hydrogen, $C_1$–$C_{12}$alkyl, phenyl or benzyl;

$R_{20}$ and $R_{21}$ independently of one another are hydrogen, CN, trifluoromethyl, $(CH_3)_3Si$—O—, $(CH_3)_3Si$— or —$COOR_{23}$; and $R_{23}$ is hydrogen, $C_1$–$C_{12}$alkyl, phenyl or benzyl; or the formula V

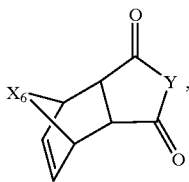
(V)

wherein

X is —$CHR_{24}$—, oxygen or sulfur;
$R_{24}$ is hydrogen, $C_1$–$C_{12}$alkyl, phenyl or benzyl;
Y is oxygen or

and
$R_{25}$ is hydrogen, methyl, ethyl or phenyl.

12. Composition according to claim 1, characterized in that the cycloolefin contains only carbon and hydrogen.

13. Composition according to claim 1, characterized in that it comprises the comonomeric cycloolefin in an amount of 0.01 to 99% by weight, based on the monomers present in the composition.

14. Composition according to claim 1, characterized in that a monophosphine is bonded to the metal atom one to three times or a diphosphine is bonded once.

15. Composition according to claim 1, characterized in that the radicals $R_{26}$, $R_{27}$ and $R_{28}$ are identical radicals.

16. Composition according to claim 1, characterized in that the phosphine ligands correspond to the formula VI wherein $R_{26}$, $R_{27}$ and $R_{28}$ independently of one another are H, $C_1$–$C_6$alkyl, cyclopentyl or cyclohexyl which are unsubstituted or substituted by $C_1$–$C_4$alkyl, or phenyl which is unsubstituted or substituted by $C_1$–$C_4$alkyl, $C_1$–$C_4$alkoxy or trifluoromethyl, or benzyl which is unsubstituted or substituted by $C_1$–$C_4$alkyl, $C_1$–$C_4$alkoxy or trifluoromethyl.

17. Composition according to claim 1, characterized in that the phosphine ligands of the formula VI are $(C_6H_5)_3P$, $(C_6H_5CH_2)_3P$, $(C_5H_{11})_3P$, $(CH_3)_3P$, $(C_2H_5)_3P$, $(n\text{-}C_3H_7)_3P$, $(i\text{-}C_3H_7)_3P$, $(n\text{-}C_4H_9)_3P$, $(C_6H_5)_2HP$, $(C_6H_5CH_2)_2HP$, $(C_5H_{11})_2HP$, $(CH_3)_2HP$, $(C_2H_5)_2HP$, $(n\text{-}C_3H_7)_2HP$, $(i\text{-}C_3H_7)_2HP$, $(n\text{-}C_4H_9)_2HP$, $(C_6H_5)H_2P$, $(C_6H_5CH_2)H_2P$, $(C_5H_{11})H_2P$, $(CH_3)H_2P$, $(C_2H_5)H_2P$, $(n\text{-}C_3H_7)H_2P$, $(i\text{-}C_3H_7)H_2P$, $(n\text{-}C_4H_9)H_2P$, $PH_3$, $(2\text{-methyl-}C_6H_4)_3P$, $(3\text{-}CH_3\text{—}C_6H_4)_3P$, $(4\text{-}CH_3\text{-}C_6H_4)_3P$, $(2,4\text{-di-}CH_3\text{—}C_6H_3)_3P$, $(2,6\text{-di-}CH_3\text{—}C_6H_3)_3P$, $(2\text{-}C_2H_5\text{—}C_6H_4)_3P$, $(3\text{-}C_2H_5\text{—}C_6H_4)_3P$, $(4\text{-}C_2H_5\text{—}C_6H_4)_3P$, $(2\text{-n-}C_3H_7\text{—}C_6H_4)_3P$, $(3\text{-n-}C_3H_7\text{—}C_6H_4)_3P$, $(4\text{-n-}C_3H_7\text{—}C_6H_4)_3P$, $(2\text{-i-}C_3H_7\text{—}C_6H_4)_3P$, $(3\text{-i-}C_3H_7\text{—}C_6H_4)_3P$, $(4\text{-i-}C_3H_7\text{—}C_6H_4)_3P$, $(2\text{-n-}C_4H_9\text{—}C_6H_4)_3P$, $(3\text{n-}C_4H_9\text{—}C_6H_4)_3P$, $(4\text{-n-}C_4H_9\text{—}C_6H_4)_3P$, $(2\text{-i-}C_4H_9\text{—}C_6H_4)_3P$, $(3\text{-i-}C_4H_9\text{—}C_6H_4)_3P$, $(4\text{-i-}C_4H_9\text{—}C_6H_4)_3P$, $(2\text{-t-}C_4H_9\text{—}C_6H_4)_3P$, $(3\text{-t-}C_4H_9\text{—}C_6H_4)_3P$, $(4\text{-t-}C_4H_9\text{—}C_6H_4)_3P$, $(2\text{-}CH_3\text{-6-t-}C_4H_9\text{—}C_6H_3)_3P$, $(3\text{-}CH_3\text{-6-t-}C_4H_9\text{—}C_6H_3)_3P$, $(3\text{-}CH_3\text{-6-t-}C_4H_9\text{—}C_6H_3)_3P$, $(2,6\text{-di-t-}C_4H_9\text{—}C_6H_3)_3P$, $(2,3\text{-di-t-}C_4H_9\text{—}C_6H_3)_3P$, $(C_6H_{11})_3P$, $(C_6H_{11})_2HP$, $(C_5H_9)_3P$, $(C_5H_9)HP$ or $(2,4\text{di-t-}C_4H_9\text{—}C_6H_3)_3P$.

18. Composition according to claim 1, characterized in that the ligands of group A are benzene which is unsubstituted or substituted by one to three $C_1$–$C_4$alkyl, or thiophene, benzonitrile or acetonitrile.

19. Composition according to claim 18, characterized in that the ligands of group A are benzene which is unsubstituted or substituted by 1 to 3 $C_1$–$C_4$alkyl.

20. Composition according to claim 1, characterized in that the arenes and heteroarenes are benzene, cumene, biphenyl, naphthalene, anthracene, acenaphthene, fluorene, phenanthrene, pyrene, chrysene, fluoroanthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acidine, chromene, phenazine, phenoxazine, phenothiazine, triazines, thianthrene or purine.

21. Composition according to claim 1, characterized in that the ligands of group B are selected from the group consisting of $H_2O$, $H_2S$ and $NH_3$; optionally halogenated, aliphatic or cycloaliphatic alcohols or mercaptans having 1 to 18 C atoms, aromatic alcohols or thiols having 6 to 18 C atoms, or araliphatic alcohols or thiols having 7 to 18 C atoms; open-chain or cyclic and aliphatic, araliphatic or aromatic ethers, thioethers, sulfoxides, sulfones, ketones, aldehydes, carboxylic acid esters, lactones, optionally N-$C_1$–$C_4$-mono or -dialkylated carboxylic acid amides having 2 to 20 C atoms, and optionally N-$C_1$–$C_4$alkylated lactams; open-chain or cyclic and aliphatic, araliphatic or aromatic, primary, secondary and tertiary amines having 1 to 20 C atoms, and cyclopentadienyls.

22. Composition according to claim 21, characterized in that the ligands are $H_2O$, $NH_3$, unsubstituted or partly or completely fluorinated $C_1$–$C_4$alkanols or cyclopentadienyl.

23. Composition according to claim 1, characterized in that the anions of inorganic or organic acids are selected from the group consisting of hydride, halide, the anion of an oxygen acid, $BF_4$, $PF_6$, $SbF_6$ and $AsF_6$.

24. Composition according to claim 23, characterized in that the anion of an oxygen acid is sulfate, phosphate, perchlorate, perbromate, periodate, antimonate, arsenate, nitrate, carbonate, the anion of a $C_1$–$C_8$carboxylic acid, sulfonate, phenylsulfonate or benzylsulfonate which are optionally substituted by $C_1$–$C_4$alkyl, $C_1$–$C_4$alkoxy or halogen, or phosphonate.

25. Composition according to claim 1, characterized in that the acid anions are $H^\ominus$, $F^\ominus$, $Cl^\ominus$, $Br^\ominus$, $BF_4^\ominus$, $PF_6^\ominus$, $SbF_6^\ominus$, $AsF_6^\ominus$, $CF_3SO_3^\ominus$, $4\text{-}CF_3\text{—}C_6H_5\text{—}SO_3^\ominus$, $C_6H_5\text{—}SO_3^\ominus$, $4\text{-methyl-}C_6H_5\text{—}SO^\ominus$, $3,5\text{-dimethyl-}C_6H_5\text{—}SO_3^\ominus$, $2,4,6\text{-trimethyl-}C_6H_5\text{—}SO_3^\ominus$ or cyclopentadienyl ($Cp^\ominus$).

26. Composition according to claim 1, characterized in that the ruthenium and osmium compounds correspond to one of the formulae VIII to VIIId

 (VIII)

 (VIIIa),

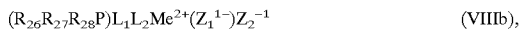 (VIIIb),

 (VIIIc),

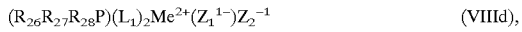 (VIIId), wherein

Me is Ru or Os;

$Z_1$ and $Z_2$ independently of one another are $H^\ominus$, cyclopentadienyl, $Cl^\ominus$, $Br^\ominus$, $BF_4^\ominus$, $PF_6^\ominus$, $SbF_6^\ominus$, $AsF_6^\ominus$, $CF_3SO_3^\ominus$, $C_6H_5\text{—}SO_3^\ominus$, $4\text{-methyl-}C_6H_5\text{—}SO_3^\ominus$, $3,5\text{-dimethyl-}C_6H_5\text{—}SO_3^\ominus$, $2,4,6\text{-trimethyl-}C_6H_5\text{—}SO_3^\ominus$ or $4\text{-}CF_3\text{—}C_6H_5\text{—}SO_3^\ominus$, $R_{26}$, $R_{27}$ and $R_{28}$ independently of one another are $C_1$–$C_6$alkyl, cyclopentyl or cyclohexyl or cyclopentyloxy or cyclohexyloxy which are unsubstituted or substituted by 1 to 3 $C_1$–$C_4$alkyl, or phenyl or benzyl or phenyloxy or benzyloxy which are unsubstituted or substituted by 1 to 3 $C_1$–$C_4$alkyl; $L_1$ is $C_6$–$C_{16}$-arene or $C_5$–$C_{16}$heteroarene which are unsubstituted or substituted by 1 to 3 $C_1$–$C_4$alkyl, $C_1$–$C_4$alkoxy, —OH, —F or Cl, or $C_1$–$C_6$alkyl-CN, benzonitrile or benzylnitrile, wherein the $L_1$ in formula VIIId are optionally different; and $L_2$ is $H_2O$ or $C_1$–$C_6$alkanol.

27. Composition according to claim 1, characterized in that the ruthenium and osmium compounds are selected from the group consisting of:

$(C_6H_{11})_3PRu(i\text{-}C_3H_7\text{—}C_6H_5)(tos)_2$, $(C_6H_{11})_3PRu(C_6H_6)(C_2H_5OH)_2(tos)_2$, $(CH_3)_3PRu(p\text{-cumene})Cl_2$, $(C_6H_{11})_3PRu(anthracene)(tos)_2$, $(C_6H_5)_3PRu(p\text{-cumene})HCl$, $[(C_6H_{11})_3P]_3Ru(CH_3\text{—}CN)$, $(C_5H_9)_3PRu(p\text{-cumene})Cl_2$, $(C_6H_{11})_3PRu[(C_4H_9)\text{—}C_6H_5]Cl_2$, $(C_6H_{11})_3POs(p\text{-cumene})Cl_2$, $(C_6H_5)_3POs(p\text{-cumene})Cl_2$, $(2\text{-}CH_3C_6H_4)_3POs(p\text{-cumene})Cl_2$, $(C_6H_{11})_3PRu(C_6H_6)(p\text{-cumene})Br_2$, $(C_6H_{11})_3PRu(CH_3CN)Cl_2$, $(CH_3)_3POs(p\text{-cumene})Cl_2$, $(C_6H_{11})_3PRu[1,2,4,5\text{-}(CH_3)_4C_6H_2]Cl_2$, $RuCl_2(p\text{-cumene})[(C_6H_{11})_2PCH_2CH_2P(C_6H_{11})_2]$, $(C_6H_{11})_3PRu(p\text{-cumene})(CH_3\text{—}CN)_2(PF_6)_2$, $(C_6H_{11})_3PRu(p\text{-cumene})(CH_3\text{—}CN)_2(tos)_2$, $(C_6H_{11})_3PRu(p\text{-cumene})(C_2H_5OH)_2(BF_4)_2$, $(C_6H_{11})_3PRu(p\text{-cumene})(C_2H_5OH)_2(PF_6)_2$, $(C_6H_{11})_3PRu[1,3,5\text{-}(i\text{-}C_3H_7)_3C_6H_3]Cl_2$, $(n\text{-}C_4H_9)_3PRu(p\text{-cumene})(CH_3\text{—}CN)_2(tos)_2$, $(i\text{-}C_3H_7)_3PRu(p\text{-cumene})Cl_2$, $(n\text{-}C_4H_9)_3PRu(p\text{-cumene})Cl_2$, $(i\text{-}C_3H_7)_3POs(p\text{-cumene})Cl_2$, $(C_6H_{11})_3PRu(chrysene)(tos)_2$, $(C_6H_{11})_3PRu(p\text{-cumene})Cl_2$, $(C_6H_{11})_3PRu(p\text{-cumene})Br_2$, $(C_6H_{11})_3PRu(p\text{-cumene})(tos)_2$, $(C_6H_{11})_3PRu(p\text{-cumene})ClF$, $(C_6H_{11})_3PRu(C_6H_6)(tos)_2$, $(C_6H_{11})_3PRu(CH_3\text{—}C_6H_5)(tos)_2$, $(C_6H_{11})_3PRu(CH_3\text{—}CN)_2Cl_2$, $(C_6H_{11})_3PRu(p\text{-cumene})HCl$, $(C_6H_{11})_2HPRu(p\text{-cumene})Cl_2$, $(C_6H_{11})_3PRu(CH_3\text{—}CN)(C_2H_5\text{—}OH)(tos)_2$, $(C_6H_{11})_3PRu(C_{10}H_8)(tos)_2$, $(C_6H_{11})_3PRu(p\text{-cumene})(C_2H_5OH)(BF_4)_2$, $(C_6H_{11})_3PRu(biphenyl)(tos)_2$ and $[(C_6H_{11})_3P]_2Ru(CH_3\text{—}CN)(tos)_2$; where tos is tosylate.

28. Composition according to claim 27, characterized in that the catalyst is $(C_6H_{11})_3PRu(p\text{-cumene})Cl_2$, $(C_5H_9)_3PRu(p\text{-cumene})Cl_2$ or $[CH(CH_3)_2]_3PRu(p\text{-cumene})Cl_2$.

29. Composition according to claim 1, characterized in that it additionally comprises a solvent.

30. Composition according to claim 1, characterized in that it comprises a single-component catalyst in an amount of 0.001 to 20 mol %, based on the amount of the monomer.

31. Composition according to claim 30, characterized in that it comprises the single-component catalyst in an amount of 0.01 to 15 mol %.

32. Composition according to claim 31, characterized in that it comprises the single-component catalyst in an amount of 0.01 to 10 mol %.

33. Composition according to claim 30, characterized in that it comprises the single-component catalyst in an amount of 0.001 to 2 mol %.

34. Composition according to claim 1, characterized in that it comprises formulation auxiliaries.

35. Composition according to claim 34, characterized in that it comprises the formulation auxiliaries in an amount of 0.1 to 70% by weight.

36. Process for the preparation of metathesis polymers, which is characterized in that a composition of (a) dicyclopentadiene, by itself or in a mixture with a strained cycloolefin and (b) a catalytic amount of at least one carbene-free, divalent-cationic ruthenium or osmium compound as a single-component catalyst, which contains at least one phosphine group and a total of 2 to 5 ligands bonded to the metal atom, and which contains acid anions for charge balancing, is heated.

37. Process according to claim 36, characterized in that it is carried out in dilute solution.

38. Process according to claim 36, characterized in that it is carried out at a temperature of at least 50° C.

39. Process according to claim 36, characterized in that the temperature is from 60 to 300° C.

40. Process for the preparation of coated materials, in which a composition of (a) dicyclopentadien, by itself or in a mixture with a strained cycloolefin and (b) a catalytic amount of at least one carbene-free, bivalent-cationic ruthenium or osmium compound as a one-component catalyst, which contains at least one phosphine group and a total of 2 to 5 ligands bonded to the metal atom, and which contains acid anions for charge balancing, and if appropriate a solvent are applied as a layer to a carrier, the solvent is removed, if appropriate, and the layer is heated for polymerization.

41. Carrier material, characterized in that a layer of a composition according to claim 1 is applied to a substrate.

42. Coated substrate with a hardened layer of the composition according to claim 1.

* * * * *